(12) United States Patent
Ksiezopolski et al.

(10) Patent No.: US 10,501,026 B2
(45) Date of Patent: Dec. 10, 2019

(54) COMBINATION SPLASH SEAL AND WEAR BAR

(71) Applicant: Lifetime Industries, Inc., Modesto, CA (US)

(72) Inventors: Edwin E. Ksiezopolski, Granger, IN (US); Kevin J. Ksiezopolski, Granger, IN (US)

(*) Notice: Subject to any disclaimer, the term of this patent is extended or adjusted under 35 U.S.C. 154(b) by 87 days.

(21) Appl. No.: 15/791,288

(22) Filed: Oct. 23, 2017

(65) Prior Publication Data

US 2018/0043844 A1    Feb. 15, 2018

Related U.S. Application Data

(63) Continuation-in-part of application No. 15/346,911, filed on Nov. 9, 2016, now Pat. No. 9,796,321, which is a continuation-in-part of application No. 14/959,840, filed on Dec. 4, 2015, now Pat. No. 9,533,629, which is a continuation-in-part of application No. 14/563,146, filed on Dec. 8, 2014, now Pat. No. 9,505,357.

(60) Provisional application No. 61/912,687, filed on Dec. 6, 2013.

(51) Int. Cl.
| | |
|---|---|
| *B60R 13/06* | (2006.01) |
| *F16J 15/02* | (2006.01) |
| *B60P 3/34* | (2006.01) |
| *F16J 15/06* | (2006.01) |
| *B60J 10/24* | (2016.01) |
| *B60J 10/246* | (2016.01) |

(52) U.S. Cl.
CPC ............... *B60R 13/06* (2013.01); *B60P 3/34* (2013.01); *F16J 15/025* (2013.01); *F16J 15/027* (2013.01); *F16J 15/061* (2013.01); *B60J 10/24* (2016.02); *B60J 10/246* (2016.02)

(58) Field of Classification Search
CPC .. B60P 3/34; B60P 3/341; B60R 13/06; B60J 10/24; B60J 10/246; F16J 15/022; F16J 15/025; F16J 15/027
See application file for complete search history.

(56) References Cited

U.S. PATENT DOCUMENTS

| | | | | |
|---|---|---|---|---|
| 6,158,171 A * | 12/2000 | Kellogg | ................ | E06B 7/2303 |
| | | | | 49/475.1 |
| 6,966,590 B1 * | 11/2005 | Ksiezopolki | .............. | B60P 3/34 |
| | | | | 296/26.01 |
| 7,380,854 B1 * | 6/2008 | Hanser | ...................... | B60P 3/34 |
| | | | | 296/26.12 |

(Continued)

*Primary Examiner* — Nicholas L Foster
(74) *Attorney, Agent, or Firm* — Botkin & Hall, LLP

(57) ABSTRACT

A seal assembly is mounted to a floor portion of an RV with a slide out room. The slide out room has a wall and a floor that is separated from the floor of the RV. The seal assembly has a floor portion, a separate wear bar and a separate bulb seal. The floor portion has a mounting portion that receives the wear bar and an exterior leg that connects the bulb seal using a tongue and groove. Fasteners connect the wear bar and floor portion to the floor of the RV. The floor portion includes a wiper that extends upwardly from an inner lateral edge. A catch wall extends adjacent the wiper and cooperates with it to form a trough for drainage. The catch wall can receive a corner piece to direct drained water to the outside of the RV.

20 Claims, 23 Drawing Sheets

(56) References Cited

U.S. PATENT DOCUMENTS

| | | | | |
|---|---|---|---|---|
| 7,540,116 B1* | 6/2009 | Martinson | B60P 3/34 | |
| | | | 52/67 | |
| 7,614,676 B2* | 11/2009 | Ksiezopolski | B60P 3/34 | |
| | | | 296/26.09 | |
| 7,614,677 B2* | 11/2009 | Ksiezopolski | B60P 3/34 | |
| | | | 296/26.09 | |
| 8,408,625 B1* | 4/2013 | Ksiezopolski | B60J 10/00 | |
| | | | 296/26.09 | |
| 8,910,422 B2* | 12/2014 | Siegel | B60P 3/32 | |
| | | | 49/490.1 | |
| 9,033,390 B1* | 5/2015 | Ksiezopolski | B60R 13/06 | |
| | | | 296/26.13 | |
| 9,038,322 B2* | 5/2015 | Ksiezopolski | F16J 15/022 | |
| | | | 52/79.5 | |
| 9,045,027 B2* | 6/2015 | Young | B60J 10/00 | |
| D741,231 S * | 10/2015 | Schoonover | D12/106 | |
| 9,505,357 B2* | 11/2016 | Ksiezopolski | B60P 3/34 | |
| 9,533,629 B2* | 1/2017 | Ksiezopolski | B60R 13/06 | |
| 9,796,321 B2* | 10/2017 | Ksiezopolski | F16J 15/025 | |
| 10,145,256 B2* | 12/2018 | Ratajac | F01D 11/003 | |
| 2006/0091687 A1* | 5/2006 | Schoffner | B60J 10/00 | |
| | | | 296/26.01 | |
| 2008/0048464 A1* | 2/2008 | Ksiezopolski | B60P 3/34 | |
| | | | 296/26.01 | |
| 2008/0073925 A1* | 3/2008 | Ksiezopolski | B60P 3/34 | |
| | | | 296/26.01 | |
| 2008/0116707 A1* | 5/2008 | Boaz | B60P 3/34 | |
| | | | 296/26.01 | |
| 2012/0079771 A1* | 4/2012 | Meulemans | E06B 7/2305 | |
| | | | 49/484.1 | |
| 2014/0097578 A1* | 4/2014 | Young | F16J 15/027 | |
| | | | 277/628 | |
| 2014/0203522 A1* | 7/2014 | Ksiezopolski | F16J 15/022 | |
| | | | 277/634 | |
| 2015/0158438 A1* | 6/2015 | Ksiezopolski | B60P 3/34 | |
| | | | 277/638 | |
| 2016/0159294 A1* | 6/2016 | Ksiezopolski | B60R 13/06 | |
| | | | 277/637 | |
| 2016/0207438 A1* | 7/2016 | Ksiezopolski | B60P 3/36 | |
| 2017/0102072 A1* | 4/2017 | Ksiezopolski | F16J 15/025 | |
| 2018/0298772 A1* | 10/2018 | Ratajac | F01D 11/003 | |

\* cited by examiner

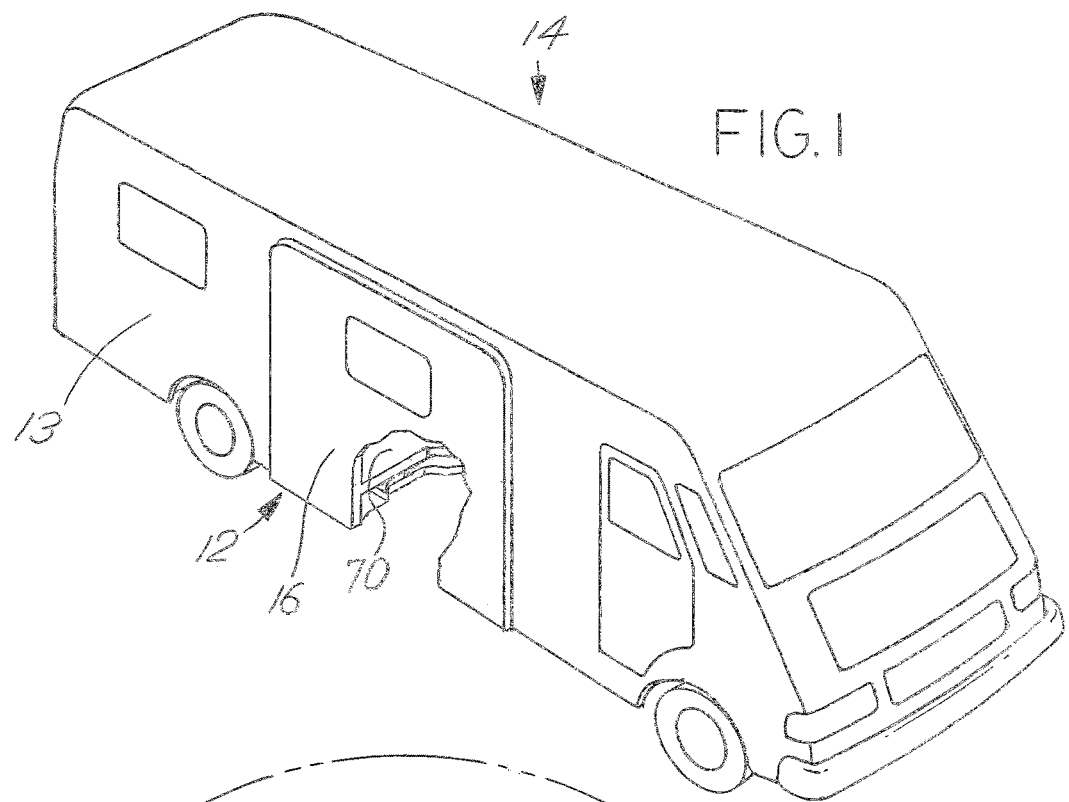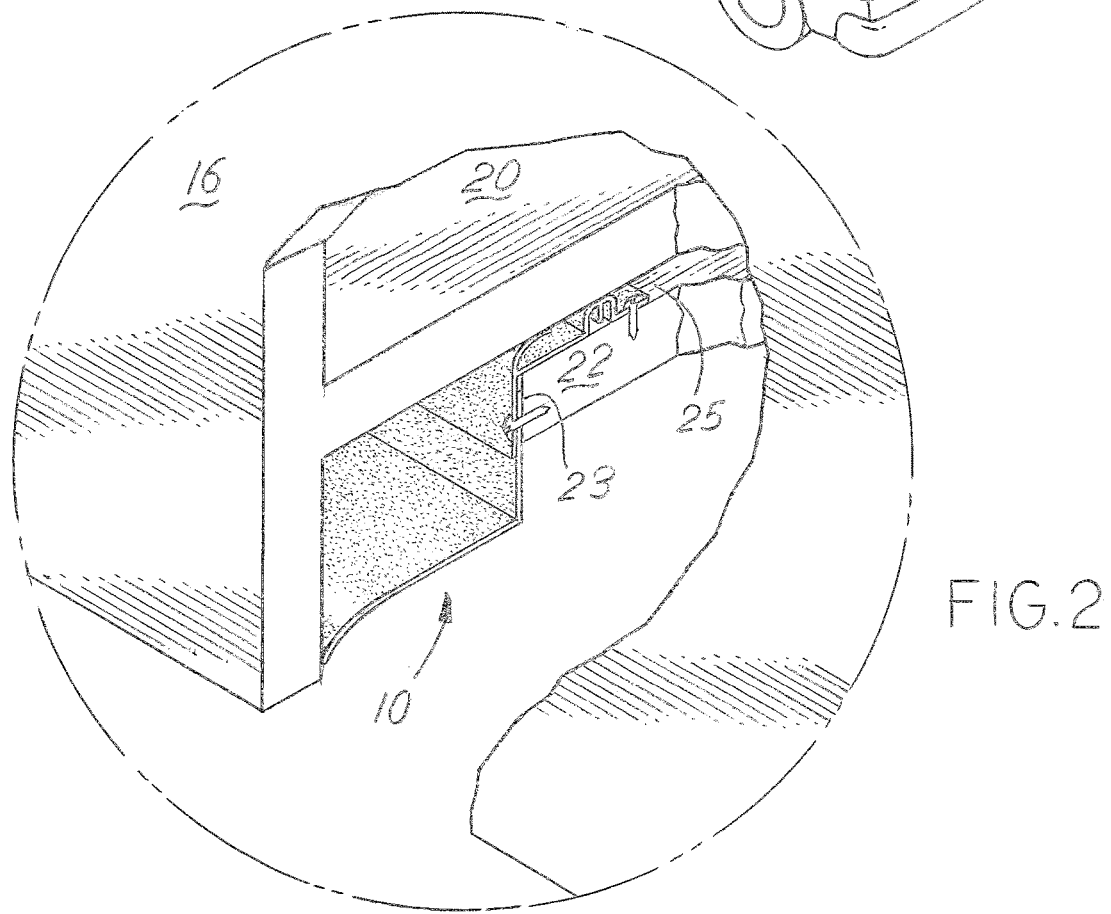

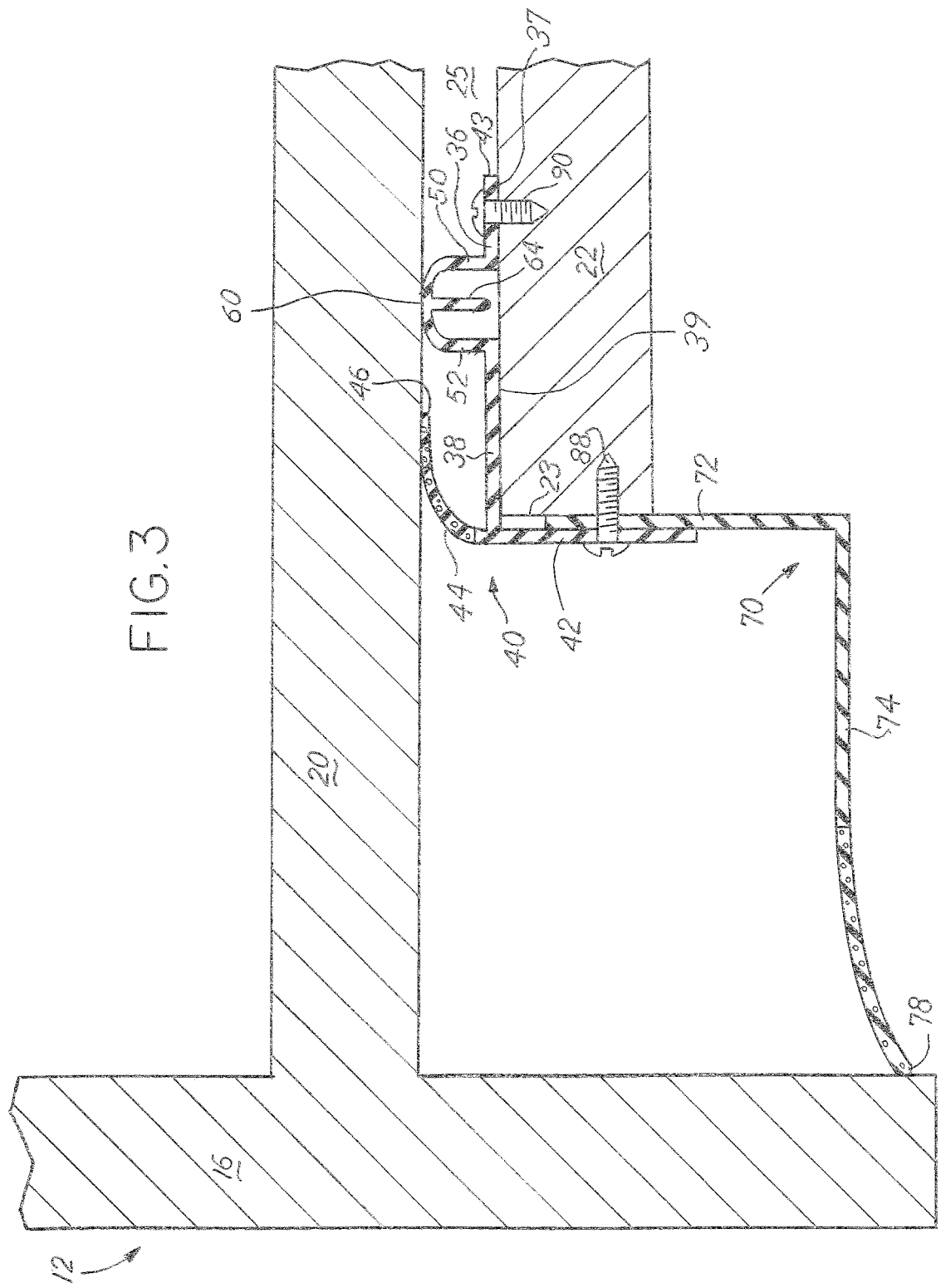

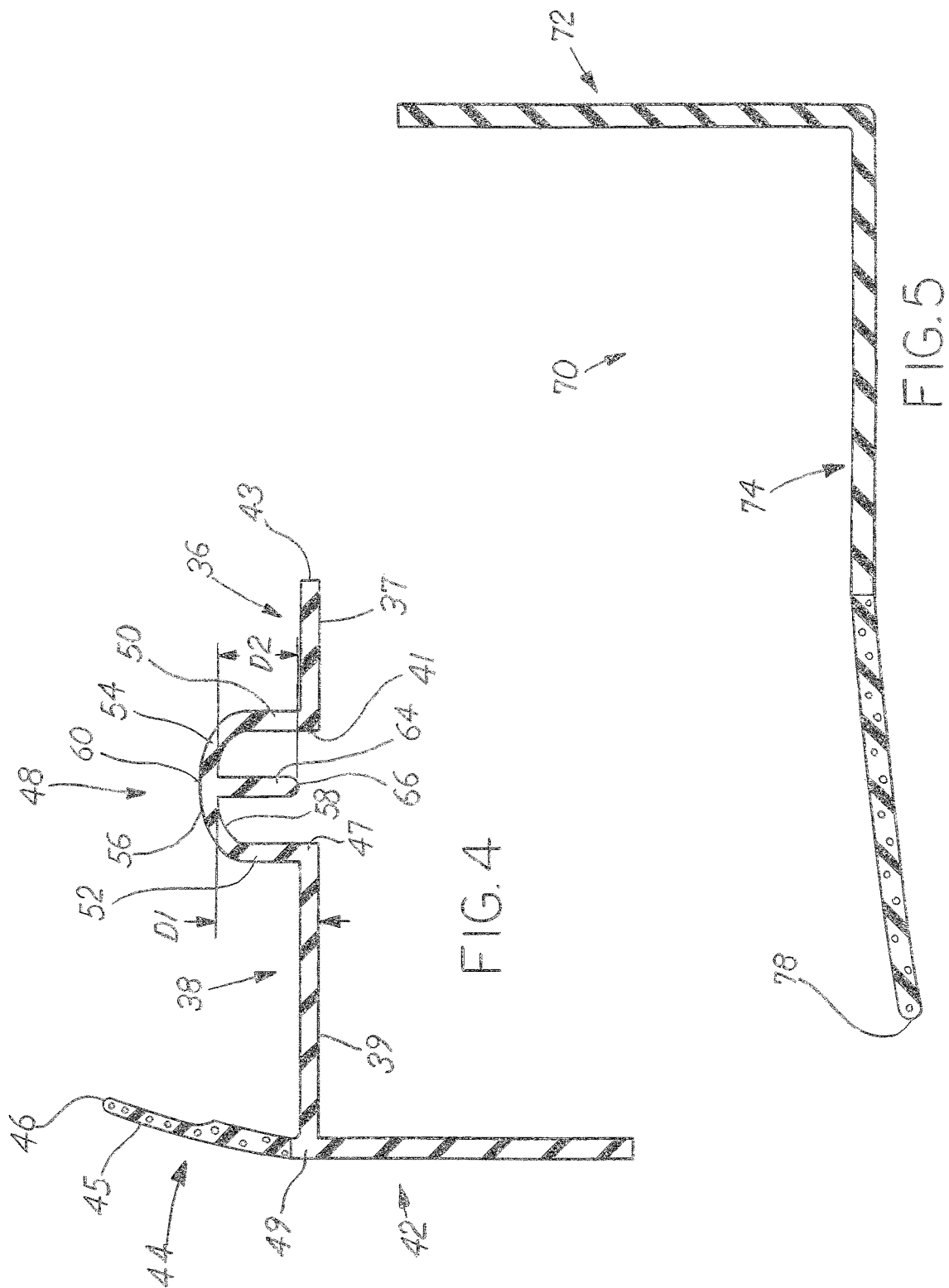

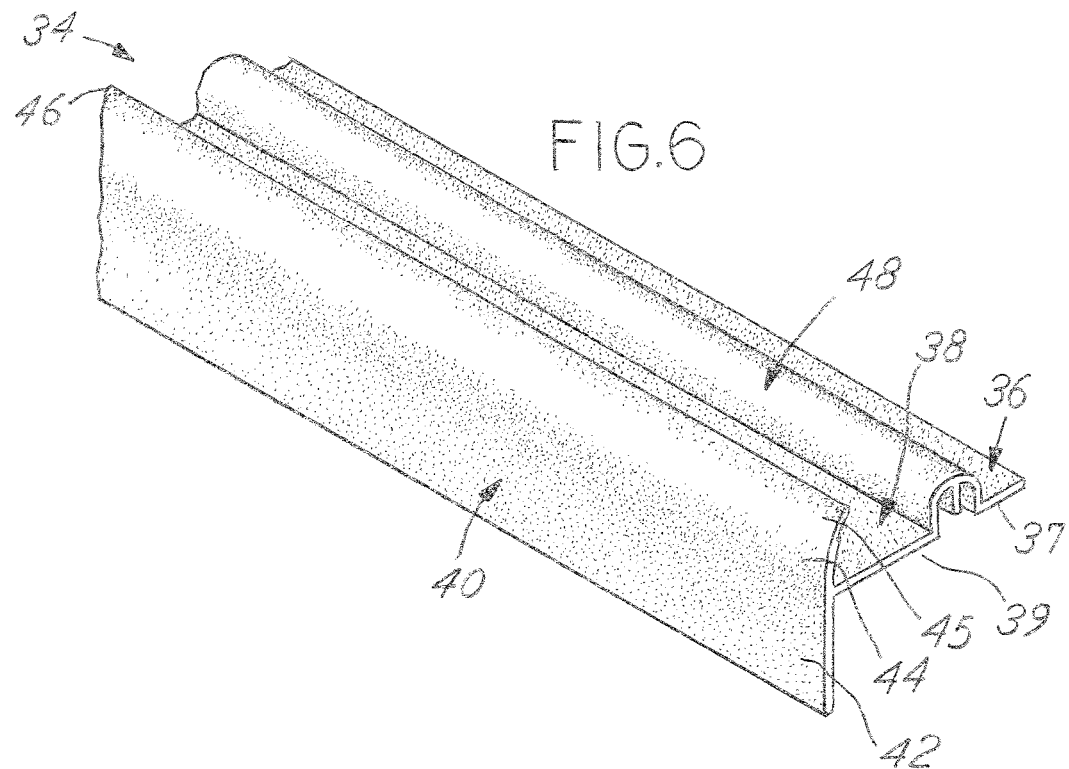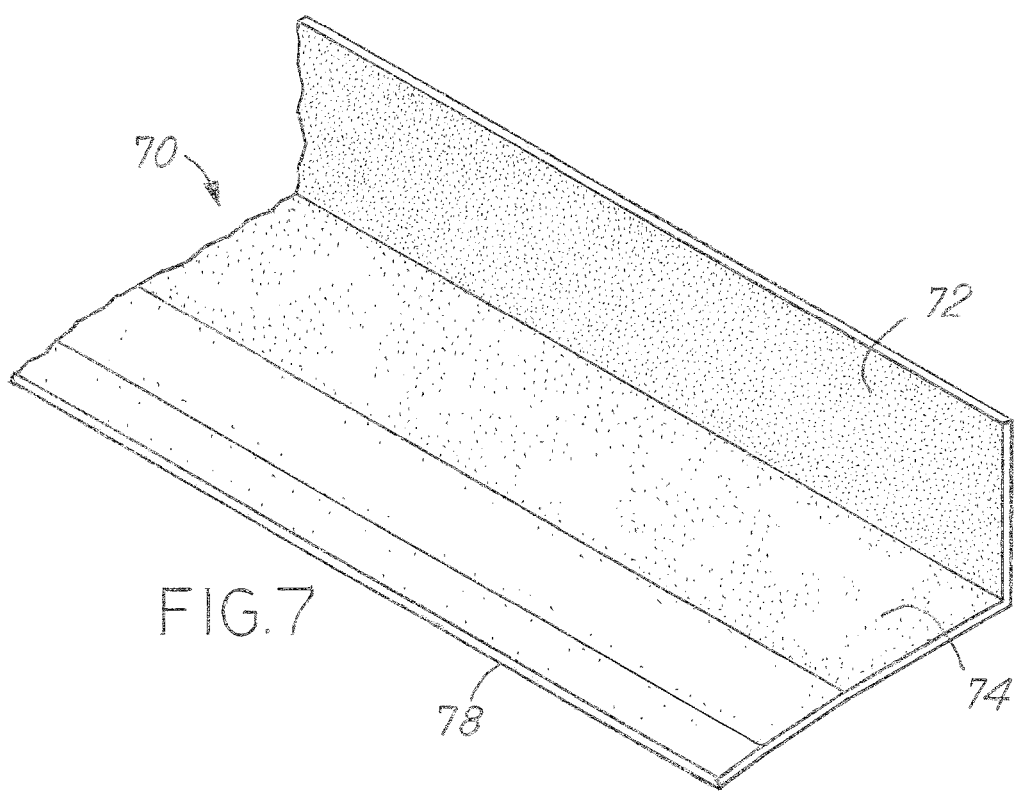

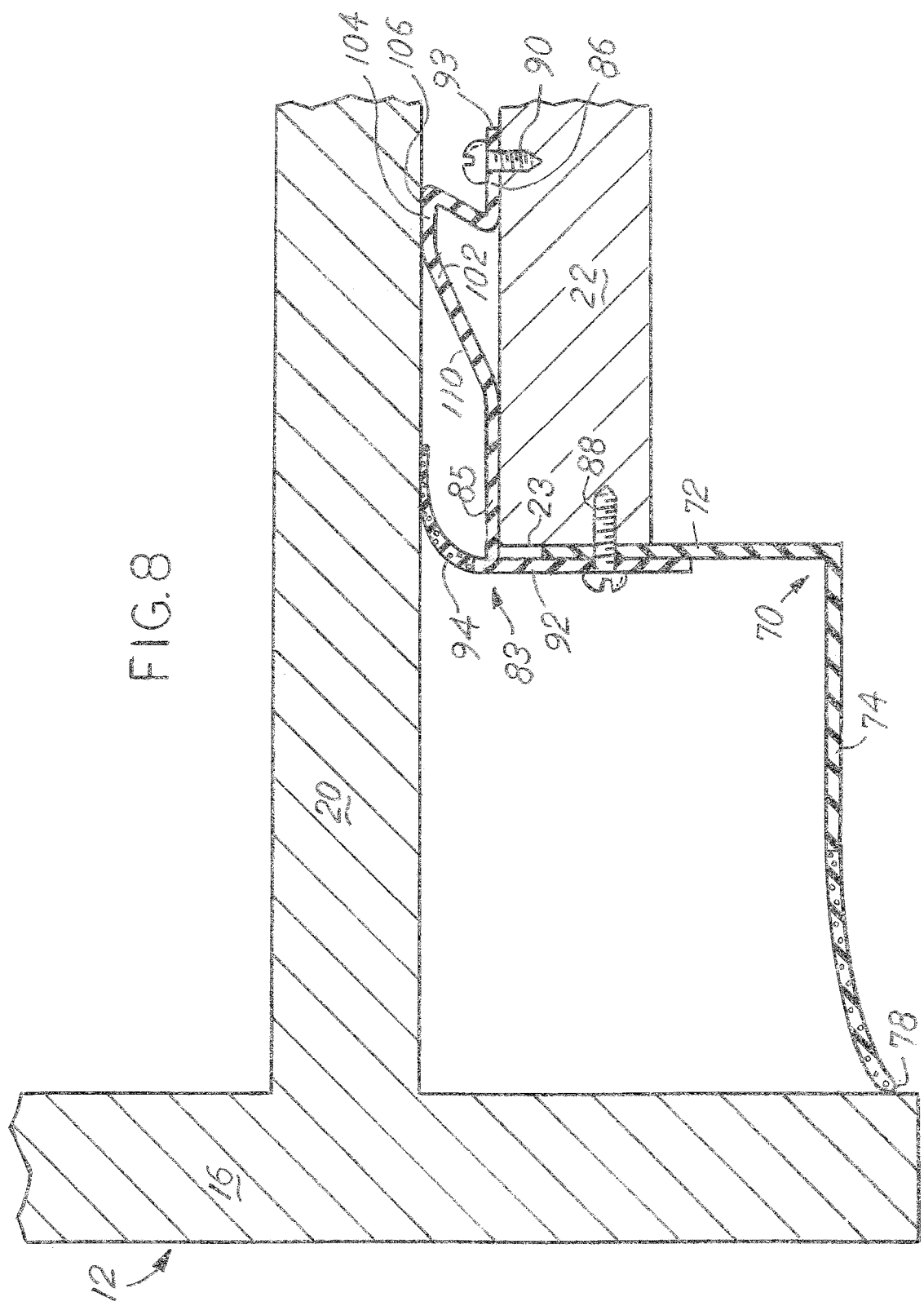

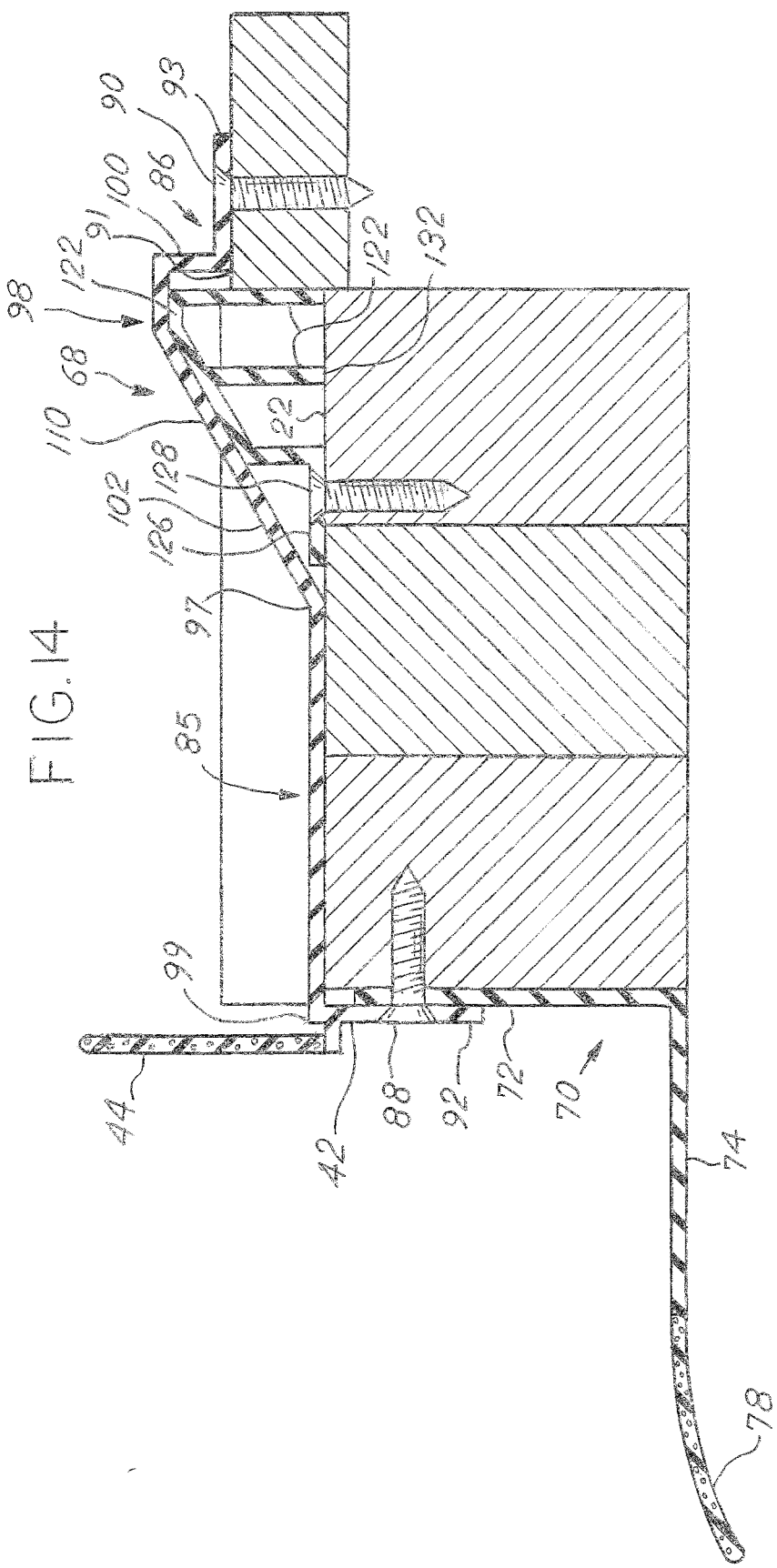

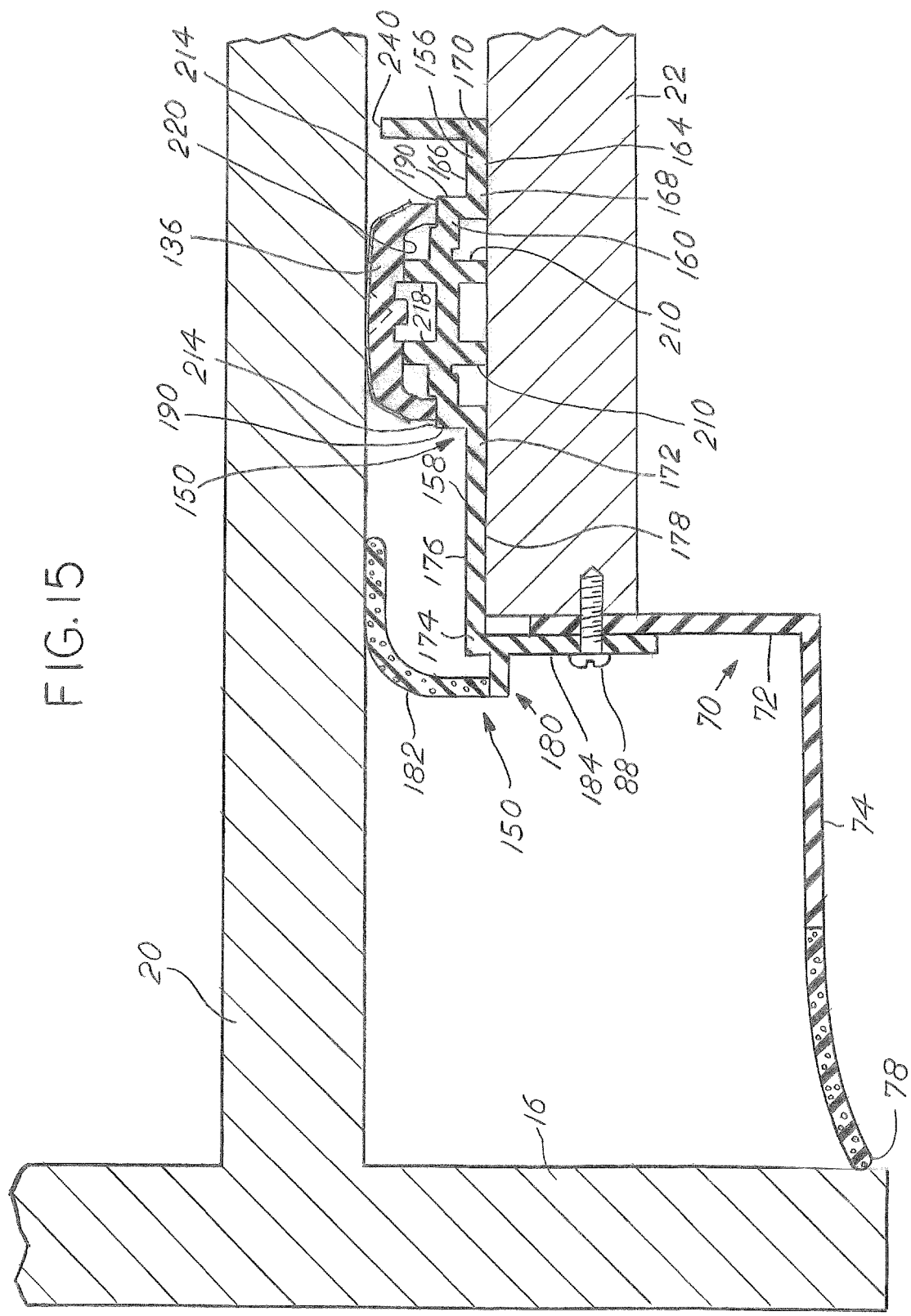

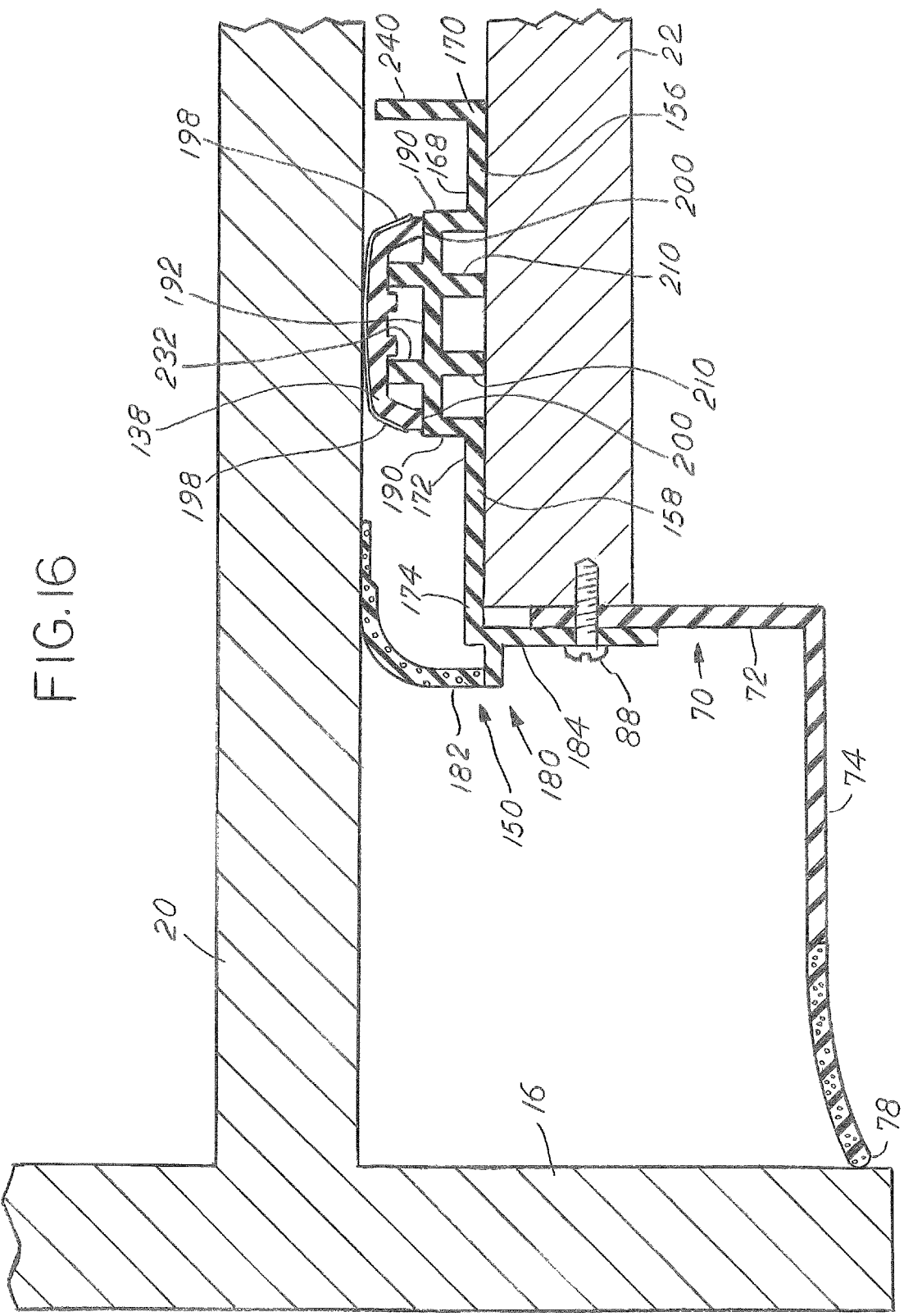

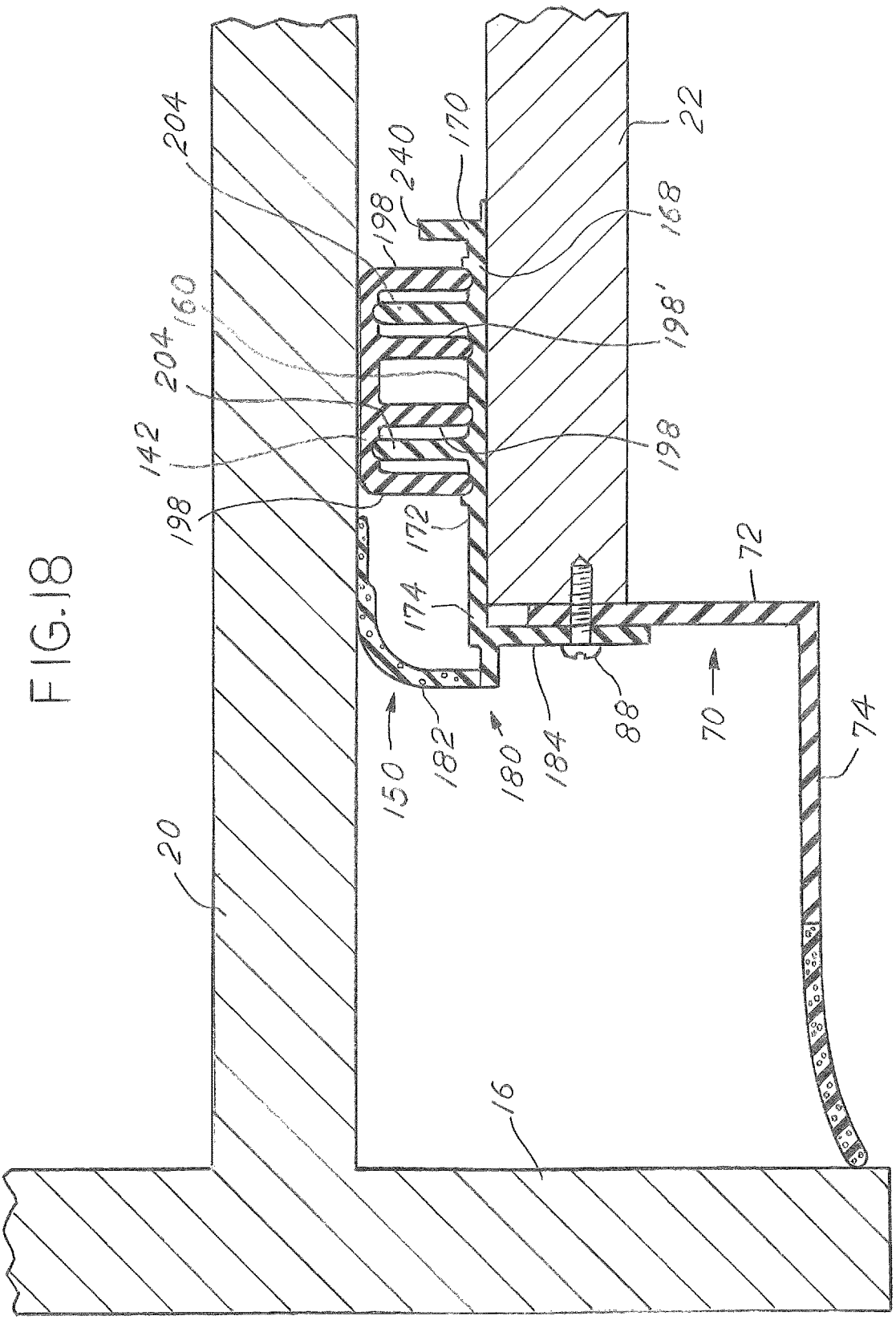

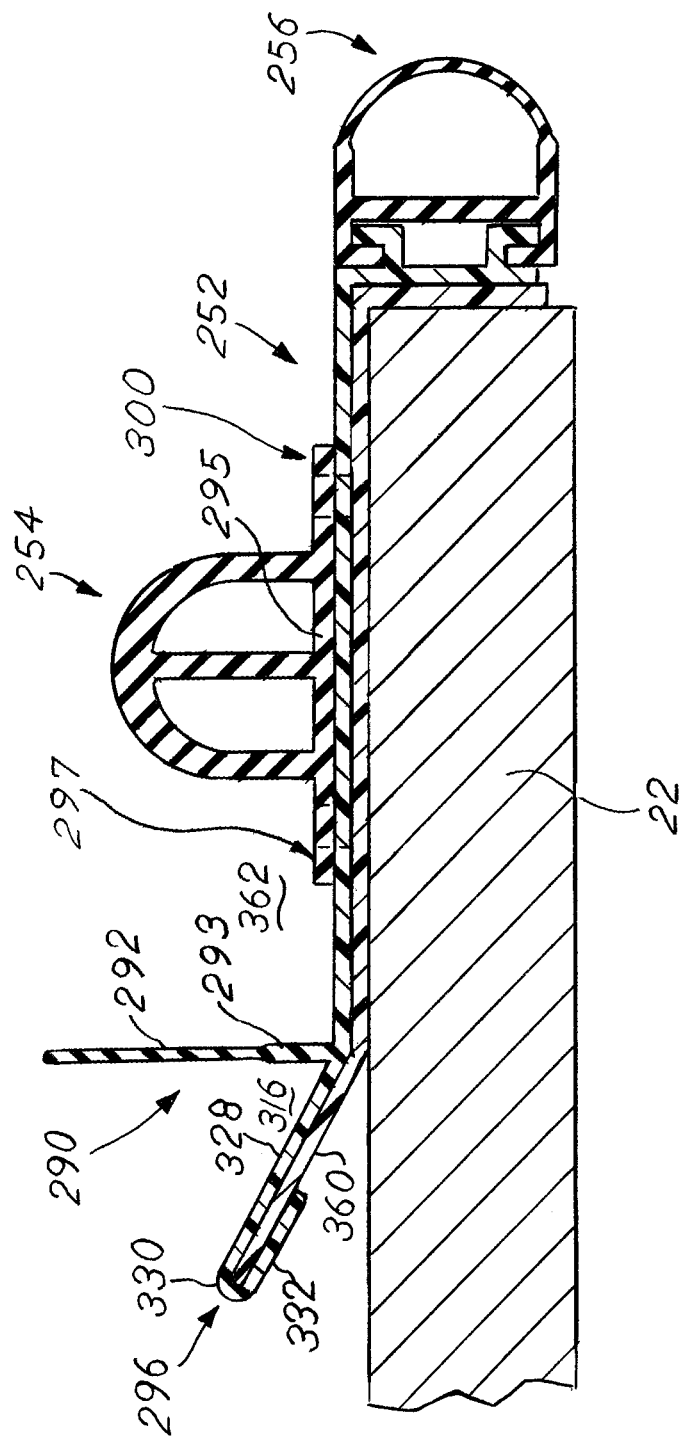

COMBINATION SPLASH SEAL AND WEAR BAR

CROSS REFERENCE TO RELATED APPLICATIONS

This application is a Continuation-in-Part of U.S. application Ser. No. 15/346,911 filed Nov. 9, 2016, which is a Continuation-in-Part of U.S. application Ser. No. 14/959,840 filed Dec. 4, 2015, now issued U.S. Pat. No. 9,533,629, which is a Continuation-in-Part of U.S. application Ser. No. 14/563,146, filed Dec. 8, 2014, now issued U.S. Pat. No. 9,505,357, which claims priority of U.S. Provisional application 61/912,687, filed Dec. 6, 2013, which application is hereby incorporated in its entirety by reference.

BACKGROUND OF THE INVENTION

Slide out rooms are commonly used to expand the usable space within a recreational vehicle ("RV"). It is important that the slide out room be sealed from the exterior of the vehicle. Inadequately sealed slide out rooms create a perception in an end user's mind that the vehicle is low quality. Gaps between parts of the slide out room and the RV create opportunity for drafts, rodents, insects, water, debris, or other undesirable elements to enter the interior of the RV. Evidence of an inadequately sealed slide out room may be light showing around where the slide out room interfaces with main RV interior, drafts around the slide out room, or water entering the RV from around the slide out room.
It is particularly difficult to effectively seal the lower portion of a slide out room. There is ample opportunity for seals near this area of the slide out room to be breached by light, air, or water. Water may be thrown up into the room during travel along roads. There is a need to prevent water from being splashed or thrown into the slide out room from below during travel.

SUMMARY OF THE INVENTION

The present disclosure describes a seal assembly that is made up of separate pieces. The first piece is designed to seal the main floor of the RV to the floor of the slide out room with an upper portion where a resilient wiper slides along the bottom of the slide out room floor. The first piece includes a wear bar made from a higher durometer that also slides along the slide out room floor. The second piece is designed to seal the floor of the RV to the side wall of the slide out room by having a sealing leg that mates to the side wall when the slide out room is in the retracted position. An alternate embodiment of the seal assembly utilizes three pieces. A floor portion has an exterior leg and a wiper. Between the exterior leg and the wiper is a mounting portion that receives a separate wear bar that is a separate replaceable component that attaches to the floor portion. The exterior leg receives a bulb seal that connects to the first piece through a tongue and groove connector. A catch wall extends upwardly adjacent the wiper to form a trough that channels water

BRIEF DESCRIPTION OF THE DRAWINGS

FIG. 1 is a perspective view of an RV having a slide out room;
FIG. 2 is a magnified view taken about area 2 in FIG. 1;
FIG. 3 is a side view of the slide out room in a retracted position over the main floor;
FIG. 4 is a side view of the floor portion of the seal show in FIG. 3;
FIG. 5 is a side view of the splash portion of the seal shown in FIG. 3;
FIG. 6 is a perspective view of the floor portion of the seal shown in FIG. 4;
FIG. 7 is a perspective view of the splash portion of the seal shown in FIG. 5;
FIG. 8 is a side view of the slide out room in a retracted position over the main floor;
FIG. 14 is a side view of a ramped floor portion that has a separate support member beneath the wear bar;
FIG. 15 is a side view of a seal beneath the floor of the slide out room of the RV;
FIG. 16 is a side view of a seal beneath the floor of the slide out room of the RV;
FIG. 18 is a side view of a seal beneath the floor of the slide out room of the RV;
FIG. 23 is a sectional view 23-23 of the wear bar and seal shown in FIG. 22.

DESCRIPTION OF THE PREFERRED EMBODIMENT

Figure 9:
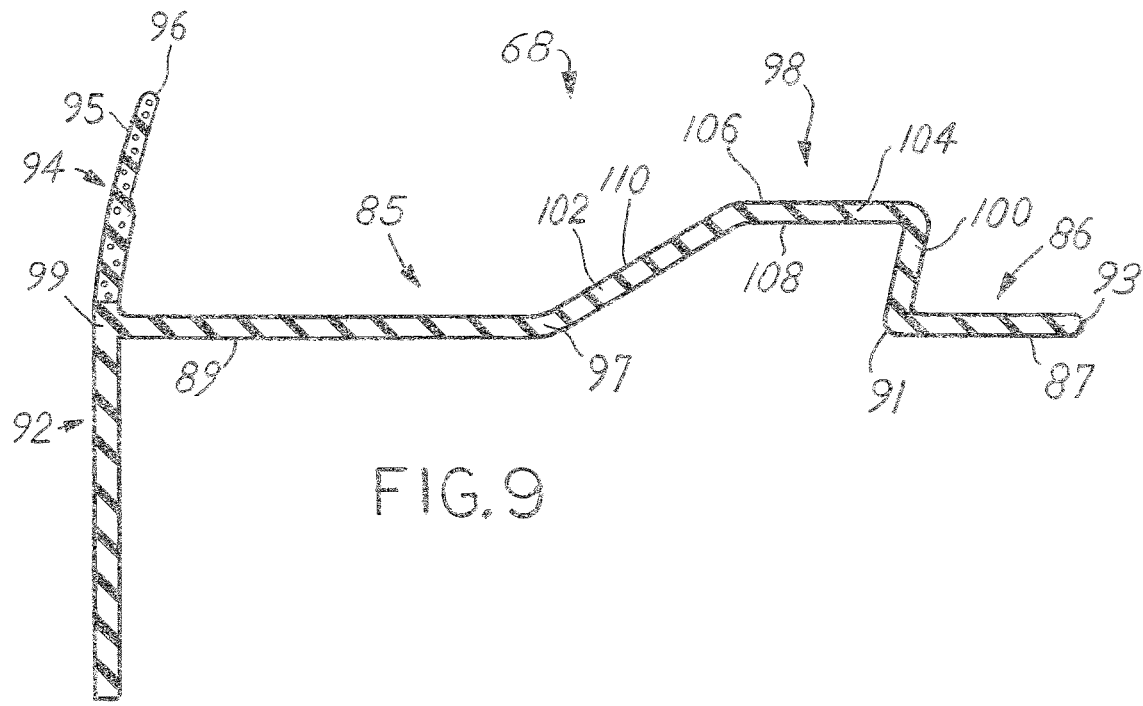
FIG. 9 is a side view of the floor portion of the seal shown in FIG. 8.

The present invention is a seal 10 useful for sealing beneath a slide out room 12 in a recreational vehicle ("RV") 14. The slide out room 12 is slidably retained in an opening in sidewall 13 of the RV 14. The slide out room 12 has an end wall 16 that faces the exterior of the RV 14 and overlaps the sidewall 13 of the RV 14. The end wall 16 is shown in FIG. 2. The end wall 16 is attached to a slide out room floor 20 that slides over a main floor 22 that serves as the floor of the recreational vehicle. The main floor 22 has an outermost edge 23 that defines the outermost portion of the floor 20. The end wall 16 is also connected to slide out room sidewalls and a roof (that are not shown) to form the slide out room 12. The slide out room 12 is slidable from a retracted position as shown in FIGS. 1 and 2 to an extended position that places the end wall 16 at a distance further spaced from the sidewall 13 of the recreational vehicle. The extended position is not shown.

The slide room floor 20 is spaced from the main floor 22 as the slide out room floor 20 slides over the main floor 22 to shift between the extended and retracted positions. FIGS. 2 and 4 show the space 25 between the main floor 22 and the slide out room floor 20. The seal 10 of the present invention is located at least partially in this space 25.

FIG. 4 shows a floor portion 34 of the seal 10 that is mounted to the main floor 22. The floor portion 34 has an inward flange 36 and an outward flange 38 that are integral and joined to a wear bar 48. The inward flange 36 has a lower surface 37 that is coplanar with a lower surface 39 on the outward flange 38. Both of the flanges 36, 38 are collinear with each other and the lower surfaces 37, 39 are coplanar. Flange 36 has a first terminal end 41 and a second terminal end 43. Flange 38 has a first terminal end 47 and a second terminal end 49. The exterior leg 40, which is attached to the second terminal end 49 of the outward flange 38, has a lower portion 42 that is adapted for locating the floor portion 34 along the outermost edge 23 of the main floor 22. The lower portion 42 is made of a relatively high durometer elastomeric material and is the same material as the inward and outward flanges 36, 38. An upper portion 44 of the exterior leg 40 extends upwardly and opposite to the lower portion 42. The upper portion 44 is coplanar and collinear with the lower portion 42 where the two meet. As will be discussed further, this having the upper portion 44 and lower portion 42 of the exterior leg 40 be collinear is not necessary. The upper portion 44 has a thinned section 45 near the distal end 46. The thinned section 45 near the distal end 46 provides for a very flexible tip that is suitable for rubbing in a sealing fashion against the slide out room floor 20. The upper portion 44 of the exterior leg 40 is resilient and more flexible than the lower portion 42. The upper portion 44, in addition to being thinned, may also be made of a lower durometer material, as is the case in the floor portion 34 shown in FIG. 4.

The inward flange 36 and outward flange 38 are separated by the wear bar 48. The wear bar 48 has an inward upright member 50 and an outward upright member 52. The inward and outward upright members 50, 52 are perpendicular to the inward flange 36 and outward flange 38 and extend upwardly opposite the lower surfaces 37, 39. The inward and outward flanges 36, 38 are integrally joined to the upright members 50, 52 at their respective terminal ends 41, 47 so that no part of the flanges 36, 38 extend beyond the upright members 50, 52. The upright members 50, 52 terminate in an arcuate top 54 that is integrally joined to the upright members 50 and 52. The arcuate top 54 has an upper surface 56 and a lower surface 58. The lower surface 58 of the arcuate top 54 is spaced away from the lower surfaces 37, 39 of the flanges 36, 38. Therefore, there is a predetermined distance D1 between the lower surface 58 of the arcuate top 54 and the plane formed by the coplanar lower surfaces 37, 39. The plane on which the coplanar lower surfaces 37, 39 rest is the main floor 22. Thus, the lower surface 58 of the arcuate top 54 is spaced from the main floor 22 by predetermined distance D1 when installed. The arcuate top 54 has a peak 60 that is evenly spaced between the upright members 50, 52. The peak 60 forms the farthest point of the wear bar 48 above the main floor 22 when installed as shown in FIG. 3. The peak 60 is the farthest location from the lower surfaces 37, 39 on the wear bar 48 and is located at the approximate midpoint of the arcuate top 54.

Figure 12:
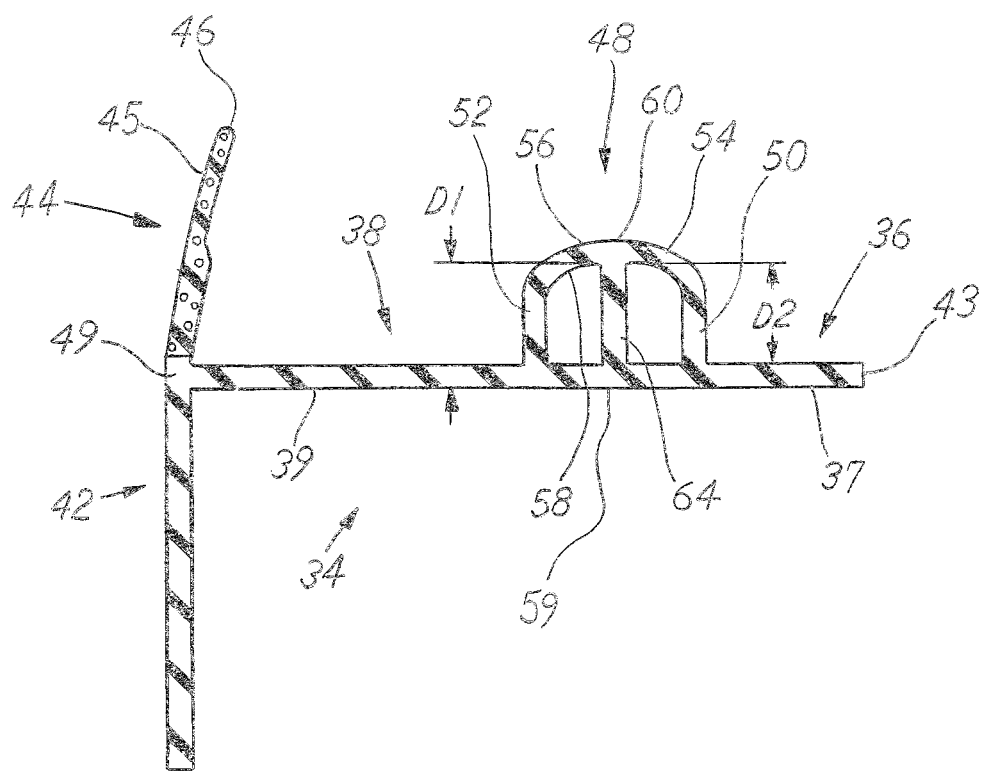
FIG. 12 is a side view of the seal shown in FIG. 4, with the addition of a bridge.

The wear bar 48 includes a strut 64 that extends from the lower surface 58 toward the lower surfaces 37, 39 of flanges 36, 38. FIG. 4 shows the strut 64. The strut 64 has a distal end 66 that is farthest from the lower surface 58 to which the strut 64 is attached. The distal end 66 is a predetermined distance D2 from the lower surface 58. Because the distal end 66 is nearer the lower surface of the arcuate top 58 than lower surfaces 37, 39, the strut 64 does not contact the main floor 22 when the wear bar 48 is in an undeformed condition as shown in FIG. 4. In other words, the strut 66 is shorter than the height of the lower surface 58 of the arcuate top 54 above the main floor 22. Under enough force, it may be possible to deform the wear bar 48 so that the strut 66 does touch the main floor 22. The strut 64 can provide some additional support for the floor 20 when it is deformed sufficiently for the strut 64 to contact the main floor 22. In the case of the wear bar 48 shown in FIG. 12, a bridge 59 spans between the inward and outward flanges 36, 38. The wear bar 48 in FIG. 12, has the strut 64 connected to the bridge 59. As such, the wear bar 48 shown in FIG. 12 is more rigid than that shown in FIG. 4. In this case, the strut 64 provides constant support for the top of the wear bar 48.

In addition to a floor portion 34, the seal 10 has a splash portion 70 that is adapted for sealing against the end wall 16. The splash portion 70 is L-shaped having a mounting leg 72 integrally joined to a sealing leg 74. The mounting leg 72 and approximately half of the sealing leg 74 are made of the same durometer material. The mounting leg 72 is adapted for being mounted to the outermost edge 23 of the main floor 22. The sealing leg 74 is made of a lower durometer material near its distal end 78. The portion of the sealing leg 74 nearest the distal end 78 is resilient and more flexible than the portion of the sealing leg 74 nearest the mounting leg 72. FIG. 5 shows the differently hatched sections indicating the aforementioned portions of the sealing leg 74. The distal end 78 is adapted for flexibly sealing against the end wall 16 of the slide out room 12 when the slide out room 12 is in its retracted position as shown in FIG. 2.

The seal 10 is installed as shown in FIG. 3. The lower surfaces 37, 39 of the inward and outward flanges 36, 38 rest upon the main floor 22. The splash portion 70 of the seal 10 is placed so the mounting leg 72 is between the lower portion 42 of the floor portion 34 and the edge 23 of the main floor 22. As shown in FIG. 3, a single fastener 88 can extend through both the lower portion 42 and the mounting leg 72 to hold the seal 10 to the RV. The sandwiching of the mounting leg 72 allows the weight of the sealing leg 74 and any force applied to the distal end 78 to be distributed across the lower portion 42 and not directly to the fastener 88. An additional fastener 90 may be driven though the inward flange 36 into the main floor 22. The fasteners 88, 90 may be screws, nails, staples, or other suitable fasteners. In its installed position, the splash portion 70 will seal against the end wall 16 to prevent water or other debris from entering the slide out room 12 from below.

Figure 10:
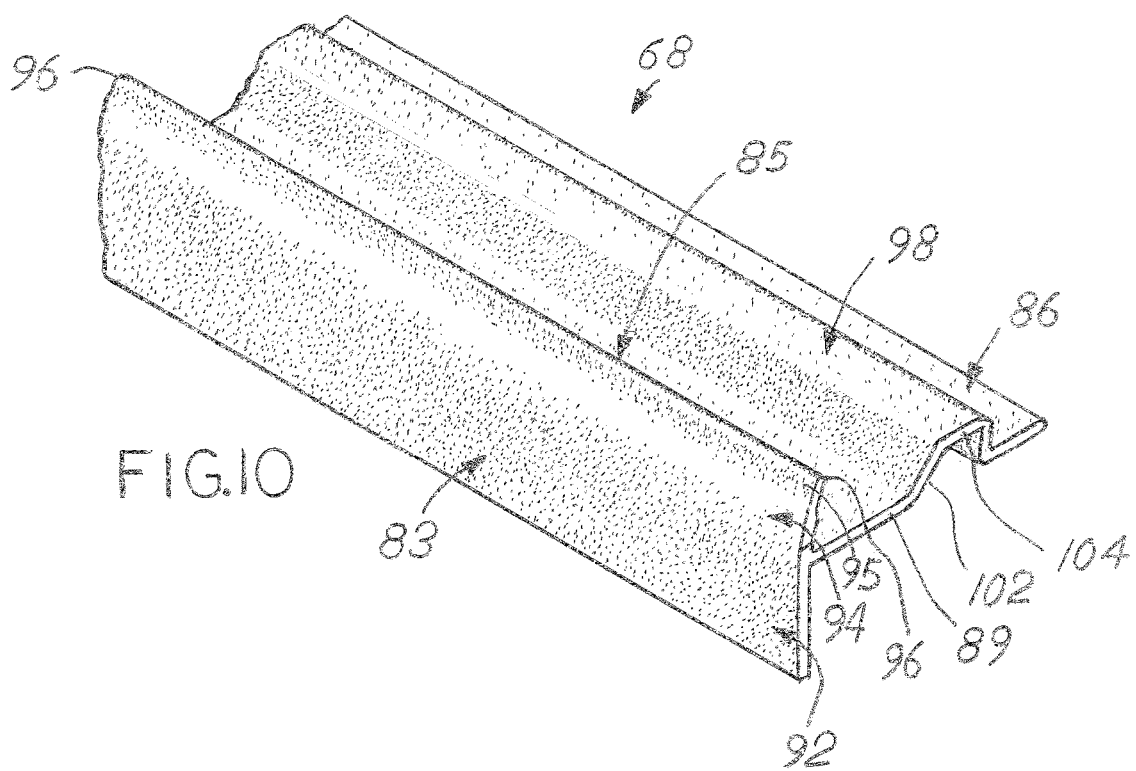
FIG. 10 is a perspective view of the floor portion of the seal shown in FIG. 8.

An alternate embodiment of the floor portion 34 has a ramped floor portion 68 in FIGS. 9-10; 13 and 14. The ramped floor portion 68 is well suited for use with a flush floor slide out, where the floor 20 of the slide out drops down when fully extended, removing a step up area when the user moves between the main floor to the fully-extended slide out floor. The ramped floor portion 68 has an inward flange 86 and an outward flange 85 that are integral and continues with an exterior leg 83 as shown in FIG. 10. The inward flange 86 has a lower surface 87 that is coplanar with a lower surface 89 on the outward flange 85. Both of the flanges 86, 85 are collinear with each other and the lower surfaces 87, 89 are coplanar. However, it is not necessary that flanges 86 and 85 are collinear, as shown in FIG. 14. Flange 86 has a first terminal end 91 and a second terminal end 93. Flange 85 has a first terminal end 97 and a second terminal end 99 as shown in FIG. 9. The exterior leg 83, which is attached to the second terminal end 99 of the outward flange 85, has a lower portion 92 that is adapted for locating the ramped floor portion 68 along the outermost edge 23 of the main floor 22 as shown in FIG. 8.

The lower portion 92 is made of a relatively high durometer elastomeric material, similarly to the lower portion 92. An upper portion 94 of the exterior leg 83 extends upwardly and opposite to the lower portion 92. The upper portion 94 is more flexible than the lower portion 92 and coplanar and collinear with the lower portion 92 where the two meet. As mentioned before, it is not necessary that the upper portion 94 and lower portion 92 are collinear. The upper portion 94 has a thinned section 95 as shown in FIG. 9 near the distal end 96. The thinned section 95 near the distal end 96 provides for a very flexible tip that is suitable for rubbing in a sealing fashion against the slide out room floor 20. The upper portion 94 of the exterior leg 83 is resilient and more flexible than the lower portion 92.

As is shown in FIG. 9, the inward flange 86 and outward flange 85 are separated by a wear bar 98. The wear bar 98 has an inward upright member 100 and an outward ramped member 102. The outward ramped member 102 had a ramped surface 110. The inward upright member 100 and outward ramped member 102 are angled with respect to flanges 86, 85 and extend upwardly opposite the lower surfaces 87, 89. The inward and outward flanges 86, 85 are integrally joined to inward and outward members 100, 102 at their respective terminal ends 91, 97 so that no part of the flanges 86, 85 extend beyond the members 100, 102. The inward and outward members 100, 102 terminate in a flat top 104 that is integrally joined to members 100, 102. The flat top 104 has an upper surface 106 and a lower surface 108. The lower surface 108 of the flat top 104 is spaced away from the lower surfaces 87, 89 of the flanges. As shown in FIG. 9, the inward upright member 100 is acutely angled with respect to the inward flange 86, but it is contemplated that it could be perpendicular. The outward ramped member 102 as shown in FIG. 10, is obtusely angled with respect to the outward flange 85. Due to the angles of the outward ramped member 102 and the inward upright member 100, when pressure is placed on the top 104, it tends to bend inwardly. An additional fastener 90 as shown in FIG. 8 may be driven though the inward flange 86 into the main floor 22. The fasteners 88, 90 may be screws, nails, staples, or other suitable fasteners. In its installed position, the splash portion 70 will seal against the end wall 16 to prevent water or other debris from entering the slide out room 12 from below.

Figure 13:
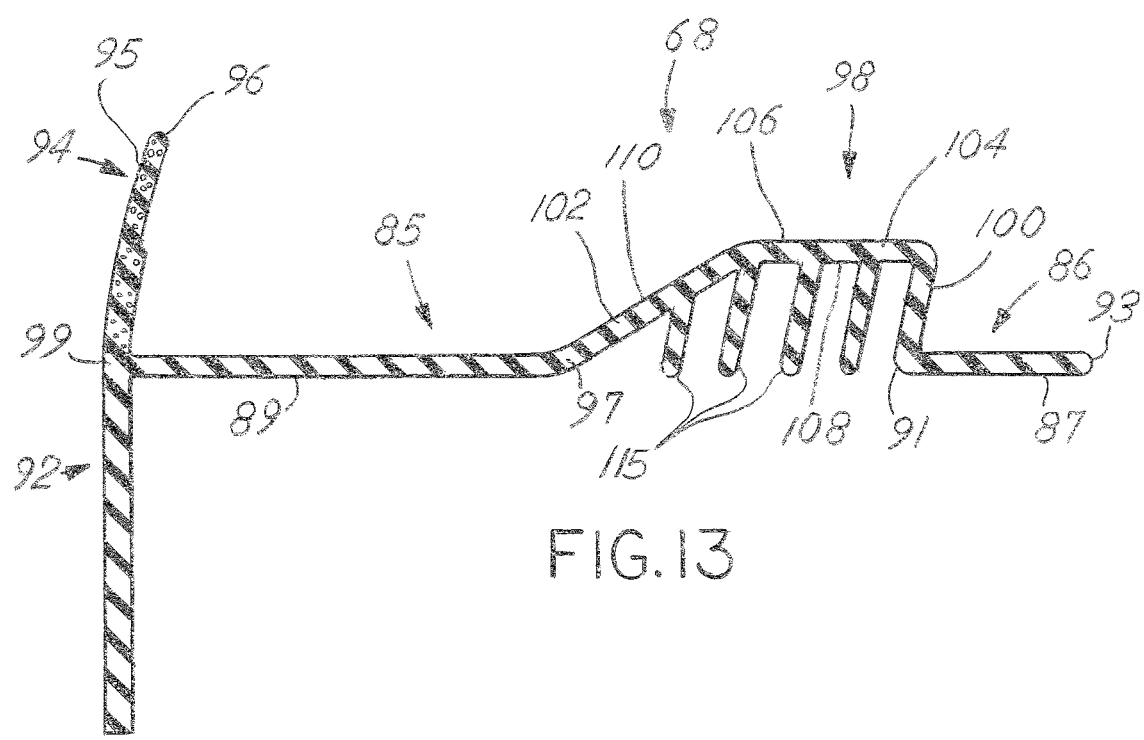
FIG. 13 is a side view of a ramped floor portion.

The ramped floor portion 68 as shown in FIG. 13 includes support ribs 115 integrally extending from the lower surface 108 of the wear bar. The support ribs support the upper surface 106 of the wear bar 98. The support ribs 115 are angled in parallel with the inward upright member 100. As such, downward force that may deflect the wear bar 98 will tend to bend the wear bar 98 inwardly toward the inward flange 86.

In some cases, it may be desirable to have support for the wear bar 98 that is not integrally attached to the wear bar 98. In such a case, a separate support member 120 may be inserted beneath the wear bar 98 as shown in FIG. 14. The separate support member 120 is an extrusion that extends longitudinally beneath the wear bar 98 in a complementary fashion and includes its own support ribs 122 that effectively rigidify the wear bar 98 of the ramped floor portion 68. The separate support member 120 includes a support ledge 126 that may receive fasteners 128 such as screws that hold the support member 120 in place while the ramped floor portion 68 is placed over it. A lower surface 127 of said support ledge 126 is adapted to rest upon the main living area floor 22. A distal end 132 of the support ribs 122 extend to be aligned with the lower surface 127 of the support ledge.

The ramped floor portion 68 shown in FIG. 14 includes an outer leg that has an offset upper portion 44 it's lower portion 42 and functions in the same way as the upper portion of FIGS. 8-13.

In certain cases, it is desirable to have a wear bar 136, 138, 140, 142 that is separately attachable to the top of the floor portion 150. Floor portions 150 as shown in FIGS. 15-18 accommodate wear bars 136, 138, 140, 142 that separately attach to the top of their corresponding floor portion 150. In the embodiment shown in FIGS. 15-18 the floor portion 150 has an inward flange 156 and an outward flange 158 that are integral and joined to a mounting portion 160 having a mounting surface 162. Inward flange 156 has a lower surface 164, an upper surface 166, a first terminal end 168 and a second terminal end 170. Outward flange 158 has a first terminal end 172, a second terminal end 174, an upper surface 176, and a lower surface 178. The lower surfaces 164, 178 are parallel to each other in the embodiments shown in FIGS. 15-18. An exterior leg 180 is attached to the second terminal end 174 of the outward flange 158. The exterior leg 180 has an upper portion 182 and a lower portion 184. The upper portion 182 extends upwardly opposite the lower portion 184, which extends below the flanges 156, 158 opposite the mounting surface 162. As shown in FIGS. 15-18, the upper and lower portions 182, 184 of the exterior leg 180 are not collinear. As in previous embodiments, the lower portion 184 is adapted for locating the floor portion 150 along the outermost edge 23 of the main floor 22.

Figure 15A:
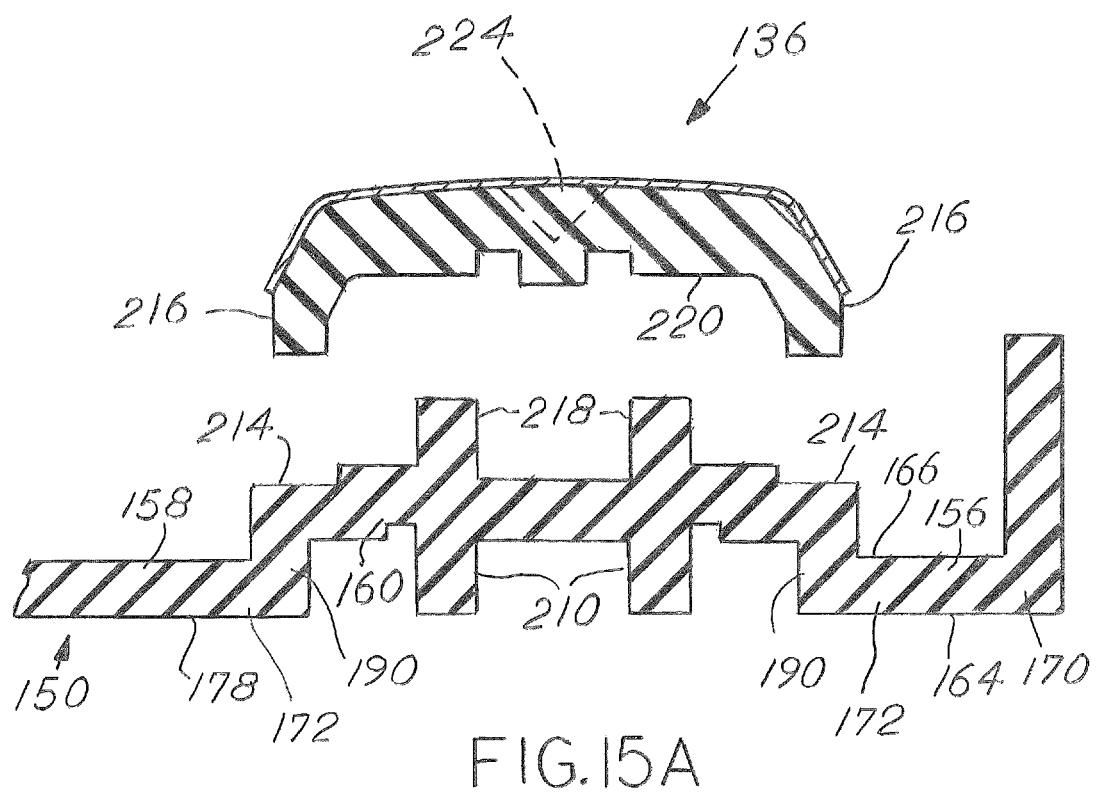
FIG. 15A is an exploded view of the wear bar of the seal in FIG. 15 above its mounting portion.

The inward flange 156 and outward flange 158 are separated by a mounting portion 160. In FIGS. 17 and 18, the mounting portion 160 is aligned with the inward and outward flanges 156, 158. In FIGS. 15 and 16, the mounting portion 160 is raised above the inward and outward flanges 156, 158. In FIGS. 17 and 18, first terminal end 168 of the inward flange 156 transitions directly into the mounting portion 160 and the first terminal end 172 of the outward flange 158 transitions directly into the mounting portion 160. In the configuration shown in FIGS. 15 and 16, the first terminal ends 172 and 168 are connected to upwardly extending ribs 190 that support a raised mounting portion 192 that is spaced above the inward flange 156 and outward flange 158.

Figure 17:
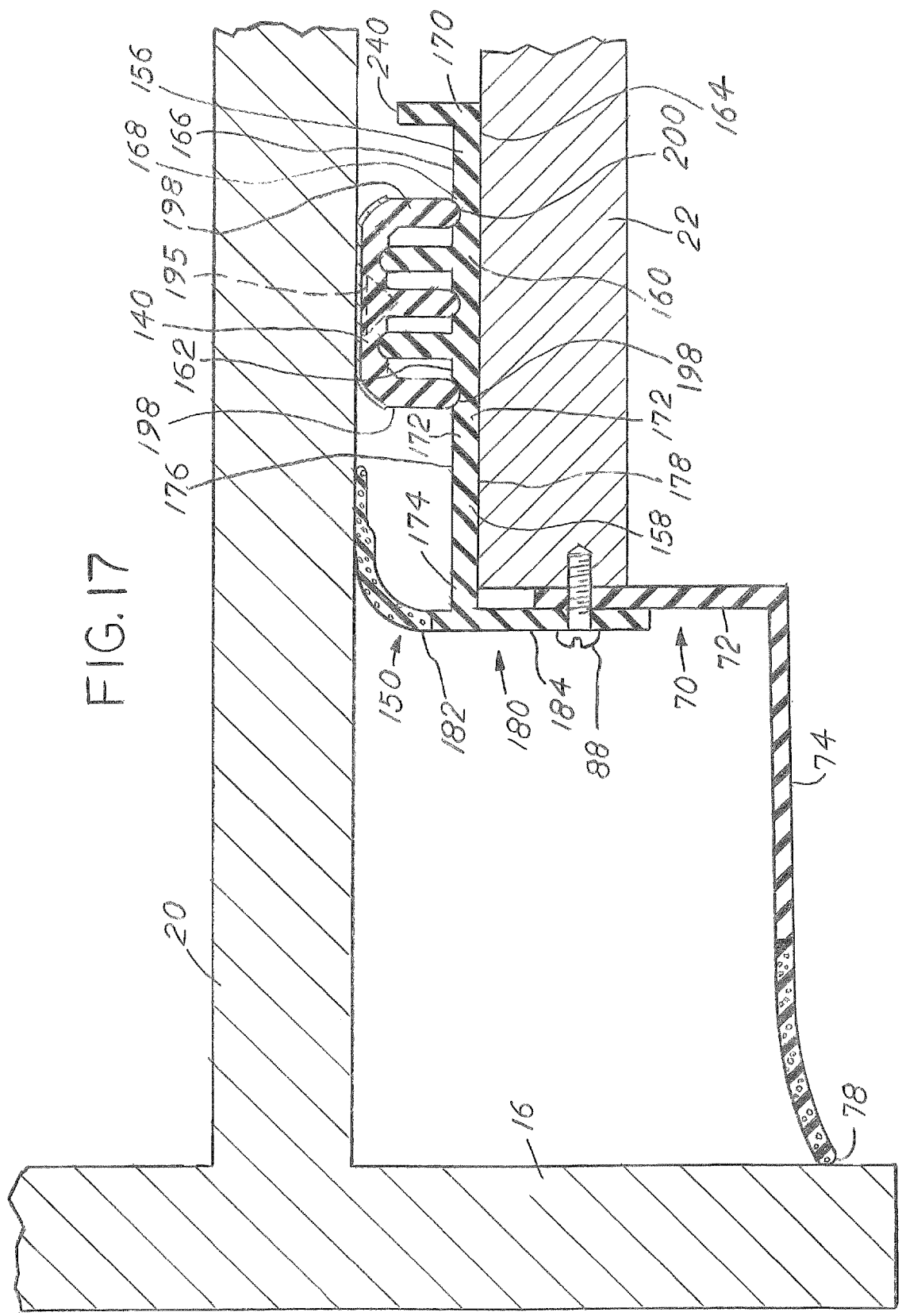
FIG. 17 is a side view of a seal beneath the floor of the slide out room of the RV.
Figure 17A:
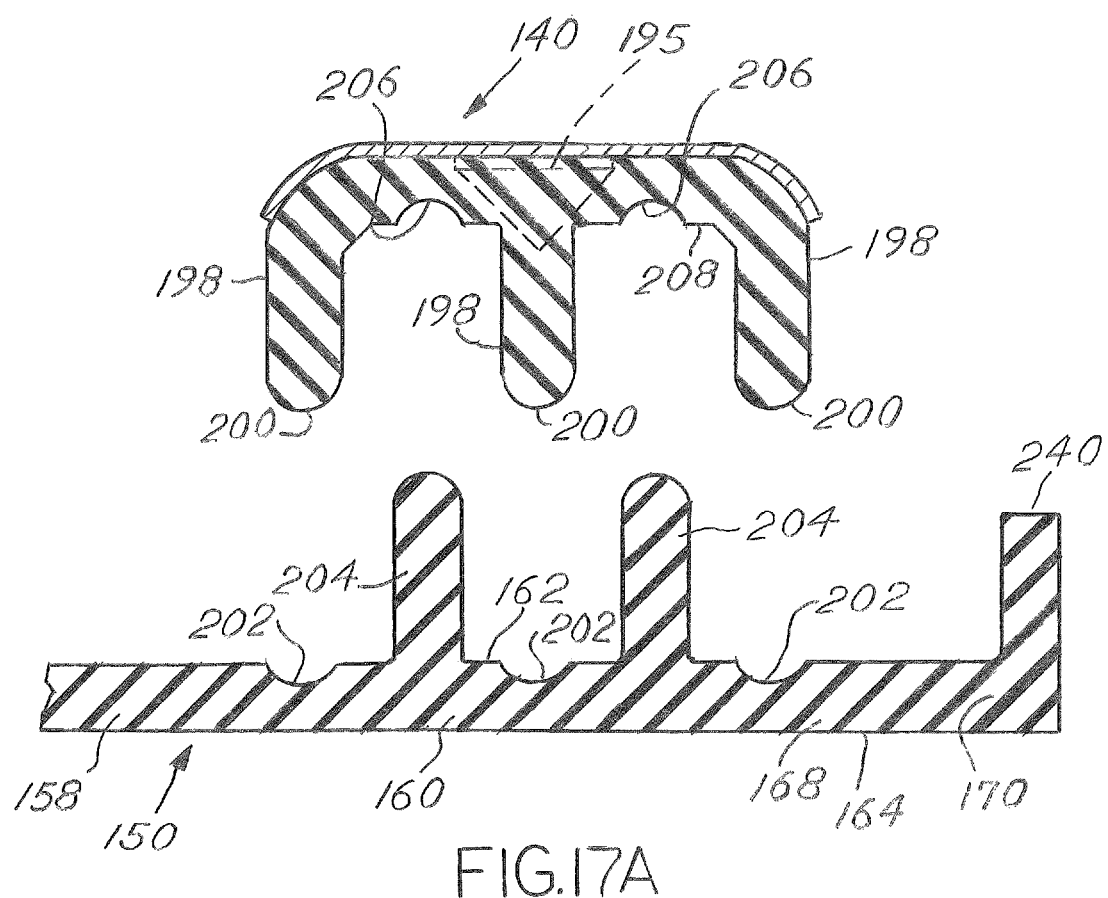
FIG. 17A is an exploded view of the wear bar of the seal in FIG. 17 above its mounting portion.
Figure 18A:
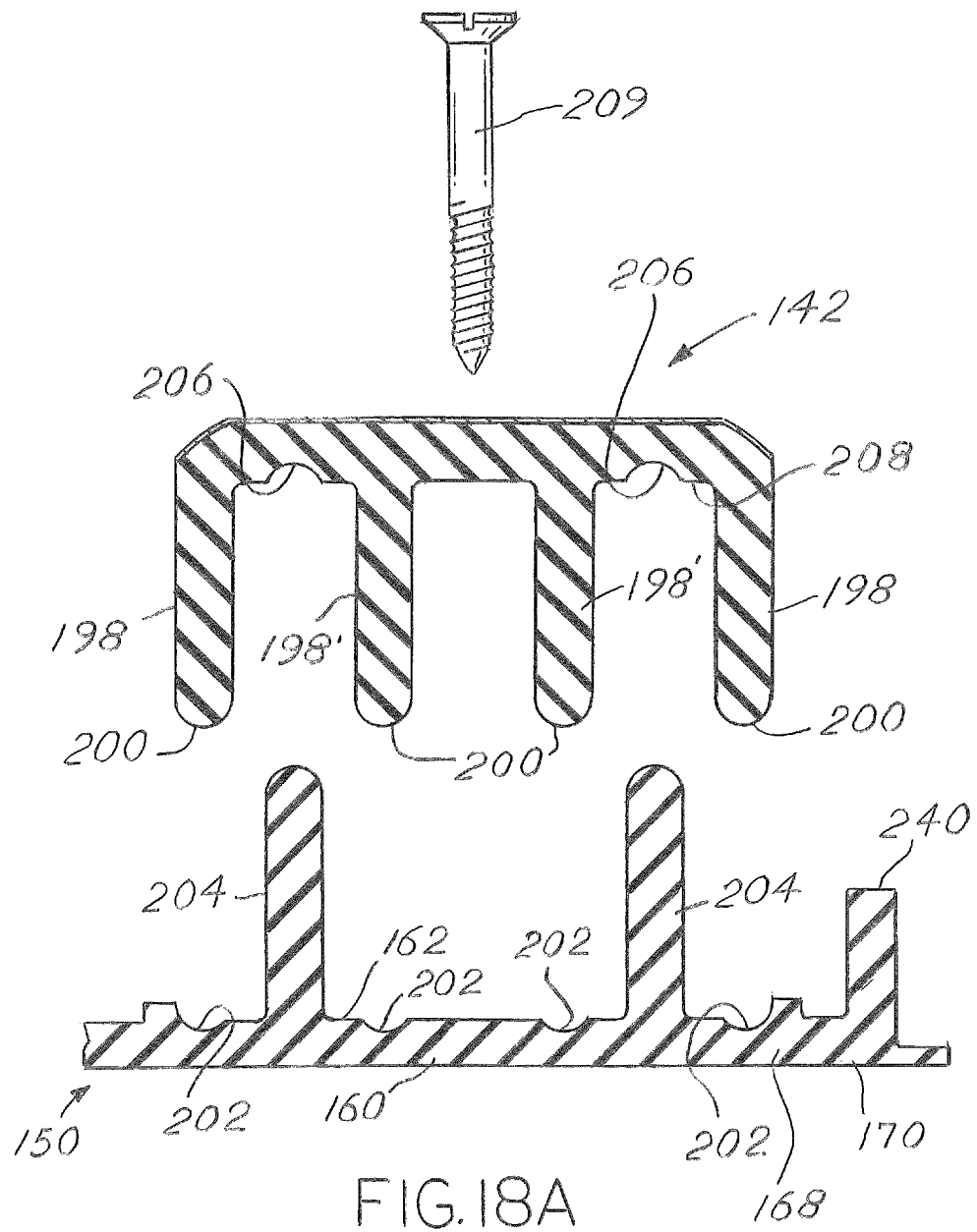
FIG. 18A is an exploded view of the wear bar of the seal in FIG. 18 above its mounting portion.

Returning to the embodiments shown in FIGS. 17 and 18, the wear bars 140 and 142 each have downwardly extending legs 198 with each leg 198 having a terminal end 200. The terminal ends 200 of the legs 198 are rounded in FIGS. 17 and 18. The mounting surface 162 of the mounting portion 160 includes detents 202 that are adapted to complementarily receive the terminal ends 200 of the legs 198, the detents 202 are best seen in exploded FIGS. 17A and 18B. This complementary fit between the legs 198 and detents 202 provides lateral stability that positively locates the wear bar 140, 142 on its corresponding mounting portion 160. Additionally, the mounting surface 162 includes legs 204 that extend upwardly to complementarily mate with detents 206 in a lower surface 208 of the wear bars 140, 142, and this provides further positive location of the wear bar 140, 142. The wear bar 140 includes a screw pocket 195 that accepts a screw (not shown in FIGS. 17 and 17A) that is driven through the wear bar 140 and through the mounting surface 162 to secure the wear bar 140 to its mounting surface 162. The wear bar 142 shown in FIGS. 18 and 18A accepts a screw 209 that is driven between the middle legs 198' into the mounting surface 162 and this is best seen in FIG. 18A.

Figure 16A:
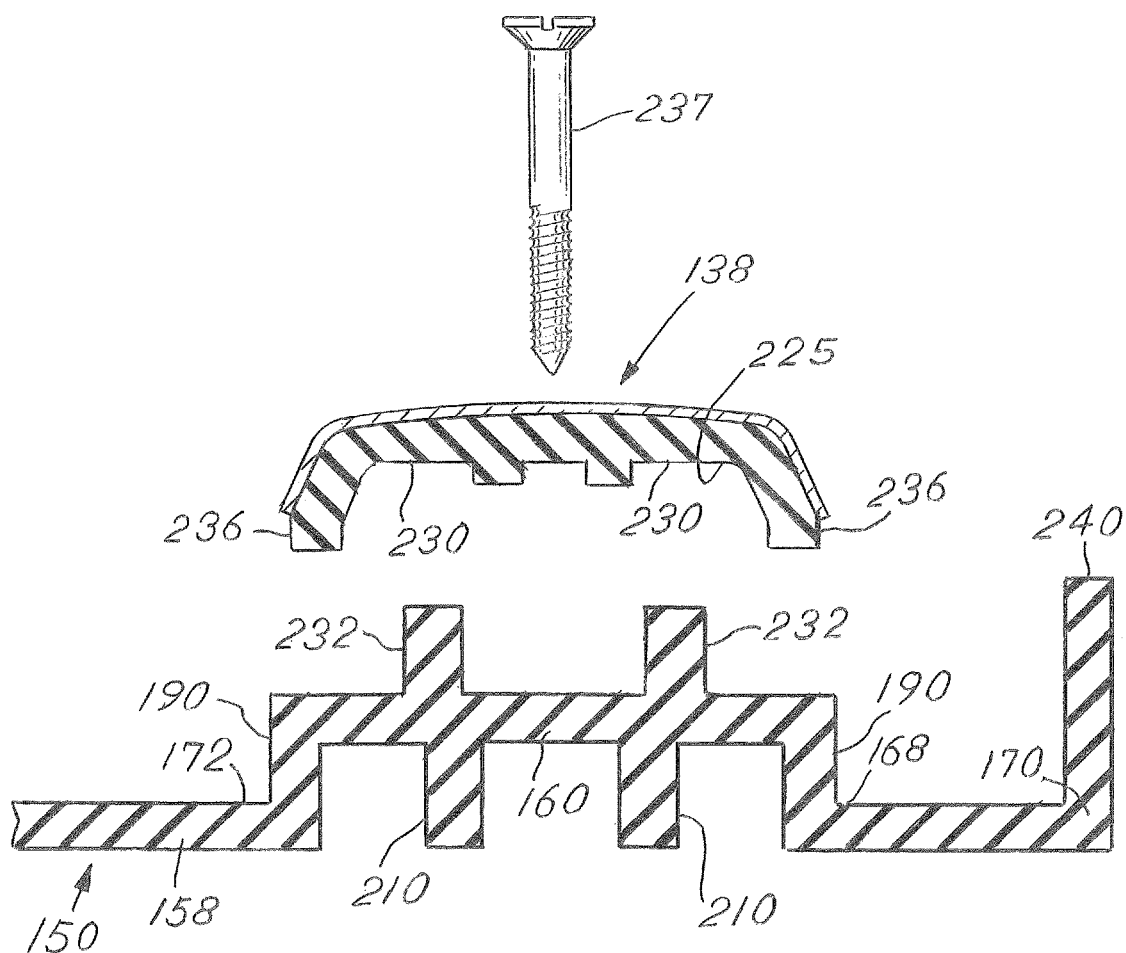
FIG. 16A is an exploded view of the wear bar of the seal in FIG. 16 above its mounting portion.

Returning to the embodiments shown in FIGS. 15 and 16, the mounting portion 160 is spaced above the inward and outward flanges 156, 158 by ribs 190. The outermost ribs 190 integrally join their corresponding first terminal end 168 of the inward flange 156 and corresponding first terminal end 172 of the outward flange 158. Middle ribs 210 provide centrally located support for the mounting portion 160. In the embodiment shown in FIG. 15, detents 214 are notches that are located opposite outermost upwardly extending ribs 190. Legs 216 extend downwardly from the wear bar 136 to complementarily mate with the detents 214. Legs 218 extend upwardly from the mounting surface 162 to mate with a lower surface 220 of the wear bar 136. A screw pocket 224 is centrally located in the wear bar 136 and can receive a screw or nail (not shown) to fasten the wear bar 136 to the mounting portion 160. In the embodiment shown in FIGS. 16 and 16A, the lower surface 225 of the wear bar 138 includes wide detents 230. Legs 232 extend upwardly from the mounting surface 162 and fit within the detents 230. The legs 232 are more centrally located within the detents 230 and provide good lateral location due to their biased inward location despite not contacting both sides of the detents 230. Legs 236 extend downwardly from the wear bar 138 to rest upon the mounting surface 162. Screw 237 can be driven through wear bar 138 as shown in FIG. 16A to fasten it to the floor portion 150. In each of the embodiments shown in FIGS. 15-18, the inward flange 156 has its second terminal end 170 joined to a back wall 240 that extends above the inward flange 156. The wear bars 136, 138, 140, 142, and floor portions 150 shown in FIGS. 15-18 are all elongate parts of indeterminate length as shown in FIG. 6 that are cut to length by an end user.

Figure 11:
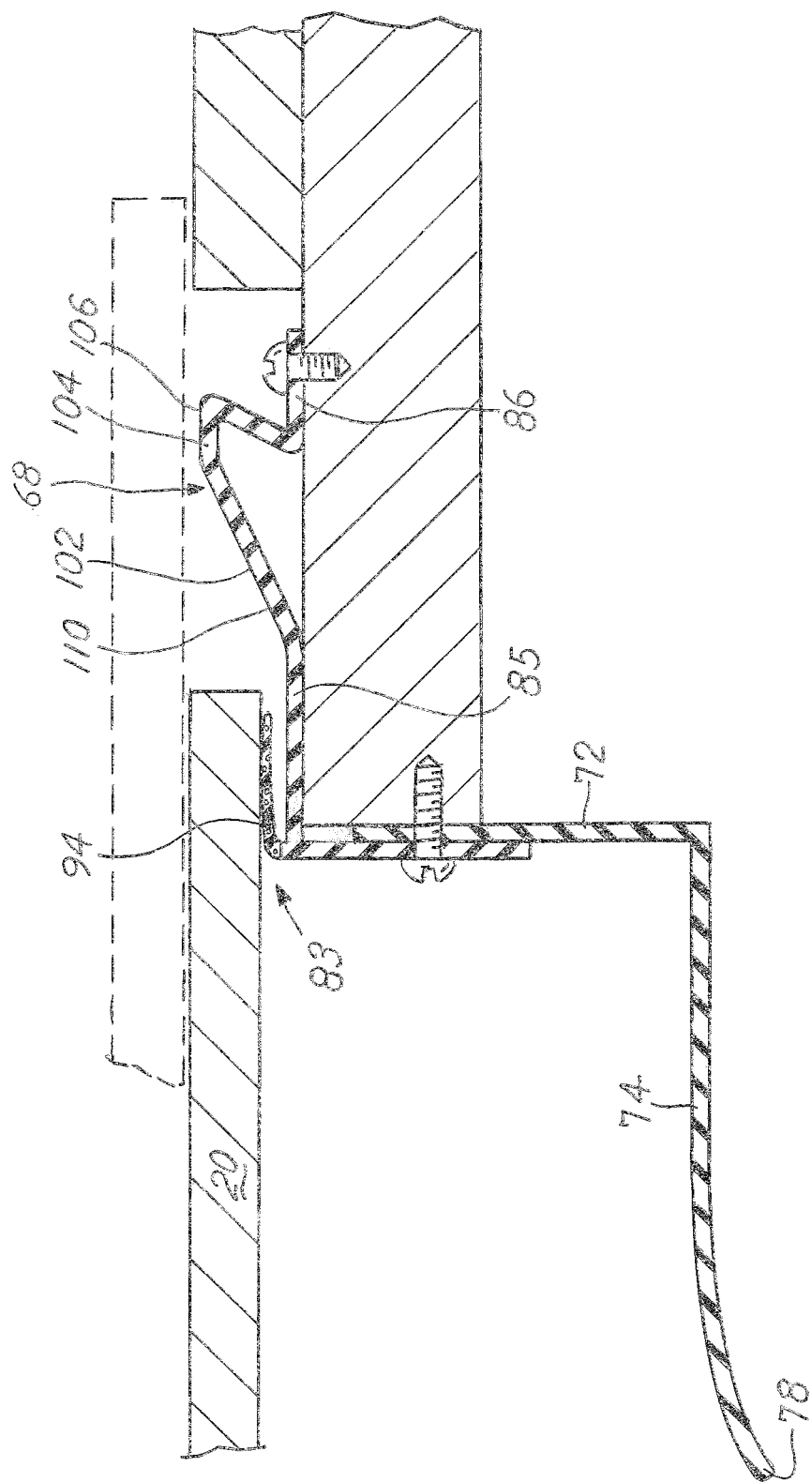
FIG. 11 is a side view of the slide out room in an extended position.

As the slide out room 12 moves between the extended and retracted position, the floor 20 slides on the upper portion 44 as shown in FIG. 2, forming a seal. As is shown in FIG. 11, if the slide out room 12 has a drop-down floor, the ramped surface 110 allows the floor 20 to smoothly transition from a position where it overlays the main floor 22 to a position where an upper surface of the floor 20 is aligned with the main floor 22. When the slide out room is retracted, the ramped surface 110 allows the floor 20 to smoothly transition to a position where it overlays the main floor 22.

In the cases that the slide out room 12 is used with a seal as shown in FIGS. 15-18, the slide out room floor 20 of the slide out room 12 slides over a corresponding wear bar 136, 138, 140, 142 and is sealed against the floor with the upper portion 182 of the floor portion 150 that contacts the floor 20 as it moves.

Figure 19:
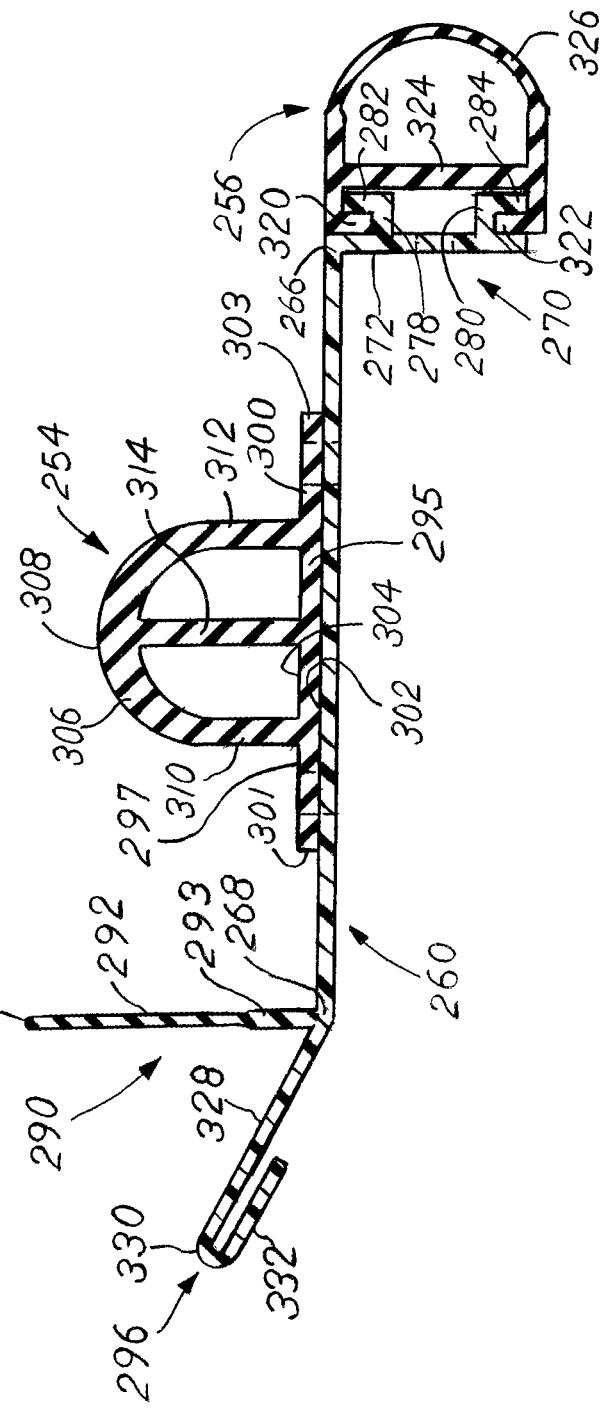
FIG. 19 is an end view of a wear bar and seal.
Figure 20:
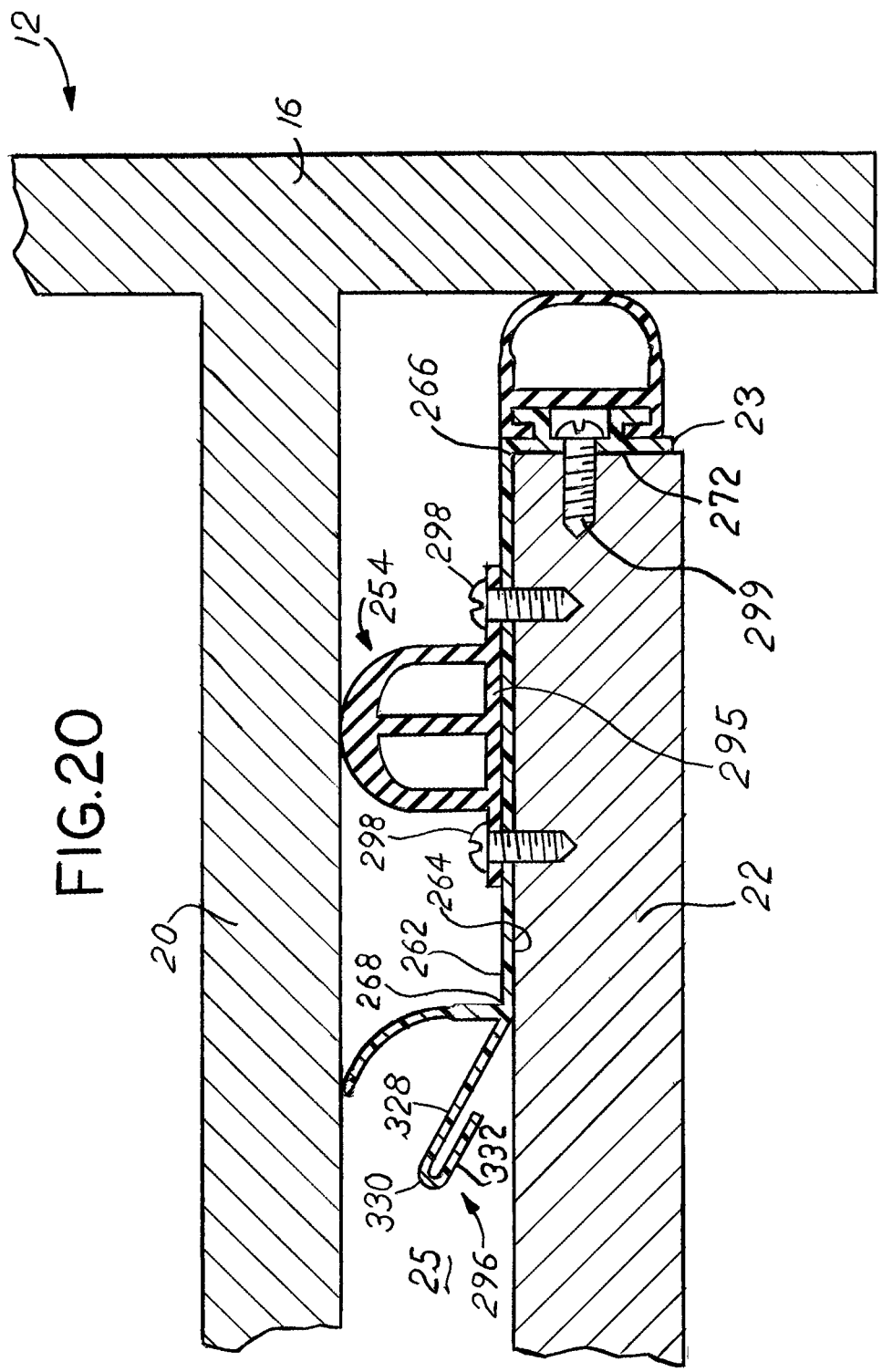
FIG. 20 is a sectional view of the wear bar and seal shown in FIG. 19 as used beneath an RV floor.
Figure 21:
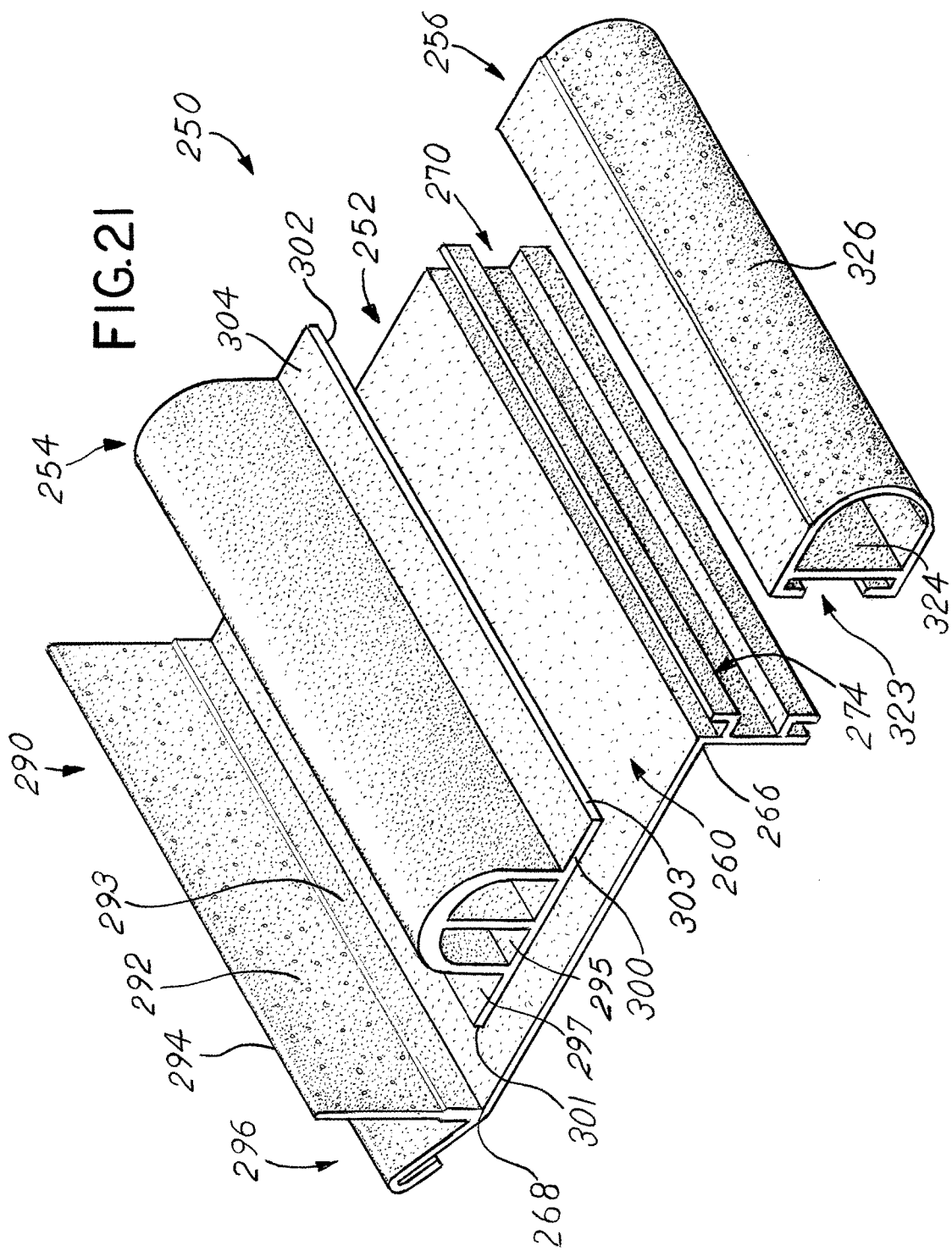
FIG. 21 is an exploded view of the seal shown in FIG. 19-20.

An alternate embodiment of the seal 250 is shown in FIGS. 19-23. The seal 250 has a floor portion 252, a separate wear bar 254, and a separate bulb seal 256. The floor portion 252 is formed from continuously extruded materials of different durometer and has a mounting portion 260 that is flat. The mounting portion 260 has an upper surface 262 and a lower surface 264. The lower surface 264 designed to directly contact the main floor 22 as shown in FIG. 20. The mounting portion 260 is defined by and located between an outer lateral edge 266 and an inner lateral edge 268. At the outer lateral edge 266 is an exterior leg 270 that extends away from the mounting portion 260 in the same direction as the lower surface 264. The exterior leg 270 has a floor facing surface 272 that is designed to contact the outermost edge 23 of the main floor 22. Located oppositely the floor facing surface 272 is a connector 274 that is designed to receive the bulb seal 256. The connector 274 has upstanding walls 278, 280 and overhanging walls 282, 284 that face away from each other. The upstanding walls 278, 280 and overhanging walls 282, 284 cooperate to form L-shaped tabs that form the connector 274. Located at the inner lateral edge 268 is a wiper 290 that has a flexible portion 292 that terminates at a terminal edge 294. As shown, the wiper 290 has a more rigid portion 293 that is formed from the same material as the floor portion 252, but it is contemplated that the flexible portion 292 extends down to the inner lateral edge 268. The flexible portion 292 is made from a material more flexible than the rest of the floor portion 252. This is commonly accomplished by co-extruding two materials having different durometer. As shown in FIG. 20, the terminal edge 294 contacts the slide out room floor 20 to form a seal as the slide out room 12 transitions between the opened and closed positions. The flexible portion 292 allows the wiper to bend, such as shown in FIG. 20. As shown in FIG. 19, the terminal edge 294 of the wiper extends upwardly further than the wear bar 254. Because it is taller, the wiper 290 maintains contact with the bottom of the floor 20. As the slide out room 12 moves to the closed position, the wiper 290 toggles to the position shown in FIG. 20. As the slide out room 12 moves the open position, the flexible portion 294, the wiper toggles in the opposite direction. Affixed at or near the inner lateral edge 268 and adjacent the wiper 290 is a catch portion 296. The catch portion 296 and wiper 290 cooperate to form a trough 316. The trough 316 provides a channel for water to drain to one of the ends of the seal 250. The catch portion 296 has a catch wall 328 with an upper edge 330. The catch wall 328 is angled away from the wiper 290 with the upper edge 330 farthest away. The upper edge 330 of the catch wall 328 extends to a hook wall 332. The hook wall 332 is spaced from and parallel to the catch wall 328. The catch portion 296 is shown as terminating at or near the wiper 290 and inner lateral edge 268, but it is contemplated that the mounting portion 260 extends beyond the wiper 290 and a portion of the trough 316 has a flat area that is coplanar with the mounting portion 260.

A separate wear bar 254 is designed to be affixed to the floor portion, as shown in FIG. 20 using fasteners 298. The wear bar 254 is an elongate member, commonly extruded and formed from a single material that is relatively rigid but still retains some resilient properties. The wear bar 254 has an inner mounting flange 297 and an outer mounting flange 300 that are aligned with a base wall 295 and continue to a flat lower surface 302 defining the bottom of the wear bar 254. The mounting flanges have upper surfaces 304, and lateral edges 301, 303. Lateral edge 303 being an outer lateral edge and lateral edge 301 being an inner lateral edge. The outer lateral edge 303 and inner lateral edge 301 define the outermost lateral boundaries of the wear bar. The wear bar 254 has an upper wall 306 with an arcuate top surface 308. The upper wall 306 is between mounting flanges 297, 300 by three walls 310, 312, 314. The mounting flange 300 extends beyond the walls 310, 312. The upper wall 306 is shown as thicker than the walls 310, 312, 314. Extra thickness in this area provides greater wear life of the wear bar 254. The movement of the slide out room 12 over the wear bar 254 wears material away from the arcuate top surface 308. It is contemplated that the upper wall 306 matches the thickness of the walls 310, 312, 314. Outer walls 310, 312 extend continuously from the upper wall 306. Strut wall 314 is a support wall that extends between the base wall 295 and the center of the upper wall 306. As shown, it is located directly underneath the center of the arcuate top surface 308. It is contemplated that the wear bar 254 could have additional strut walls or walls that are offset from the center of the top surface 308. It is further contemplated that the arcuate top surface 308 is connected to the mounting flange 300 by one solid wall where the separate wear bar 254 is a solid component. Much like the cavities created between the walls 310, 32, 314, other material-saving features such as coring may be implemented.

The bulb seal 256 is also formed from continuously extruded materials of different durometers. There are inwardly facing tabs 320 and 322 of a higher durometer, forming a connector 323. The connector 323 is formed from L-shaped tabs and mates with the connector 274 using a tongue and groove. The tongue and groove connector allows the bulb seal 256 to be slid onto the floor portion 252 along its length. The L-shaped tabs have offset walls and overhanging walls. As shown, the overhanging walls of the L-shaped tabs face each other, but it is contemplated that the overhanging walls face away from each other and the overhanging walls facing each other is located on the connector 274. A web 324 is formed from a similarly higher durometer. The bulb portion 326 is formed from a lower durometer, giving the bulb portion 326 the ability to deform when pressure is applied. Since the web 324 is formed from a higher durometer, it resists deformation compared to the bulb portion 326. The higher durometer web 324 may extend partially into the bulb portion 326, giving increased resistance to deforming or crushing or to guide the seal to a specific shape in the compressed position. FIG. 20 shows the bulb portion 326 partially compressed as it is contacting the end wall 16.

Figure 22:
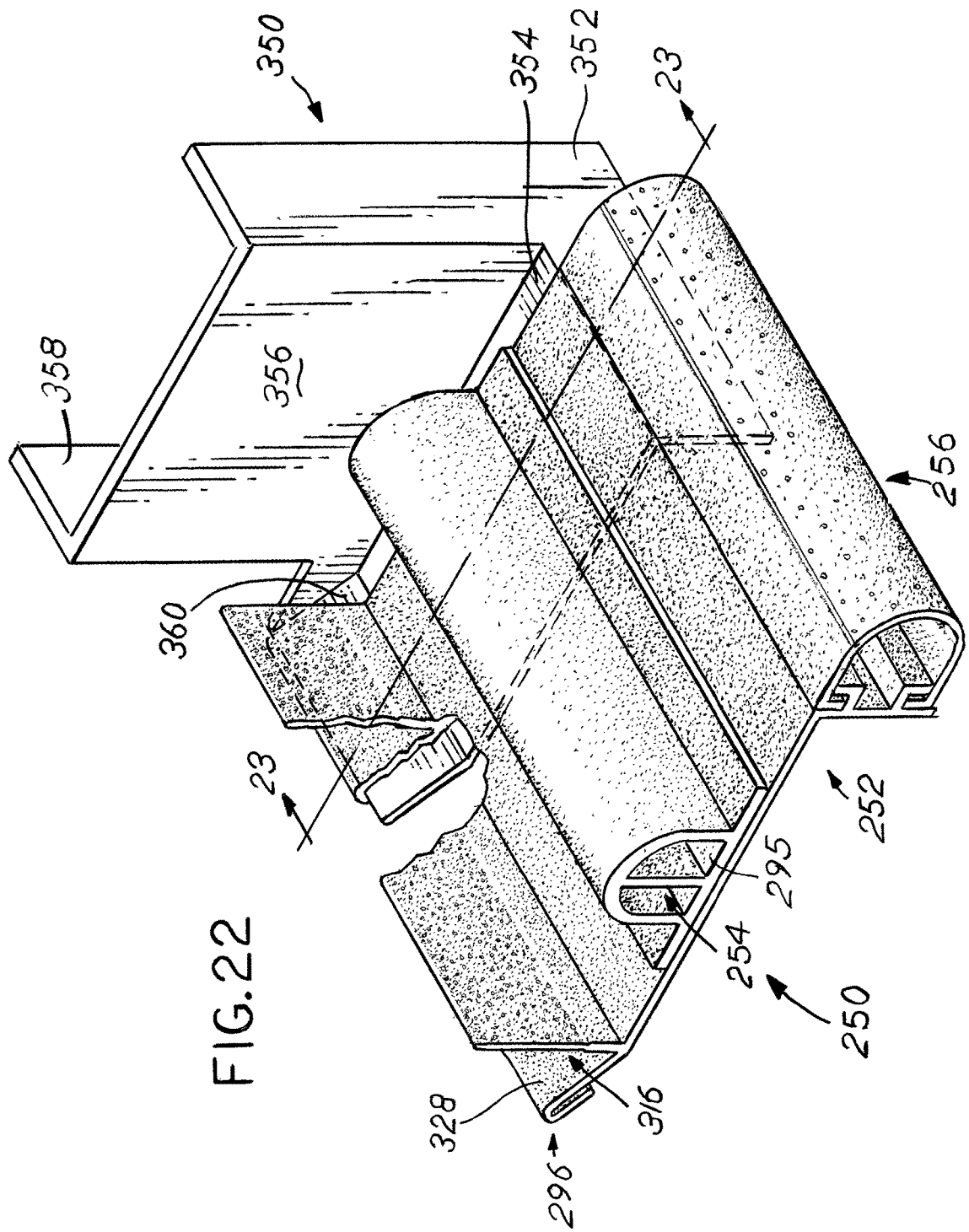
FIG. 22 is a view of the seal shown in FIGS. 19-21 assembled into a corner for a slide out room of an RV.

The seal 250 is designed to mate with a corner 350 at its terminal ends as shown in FIG. 22. The corner 350 has a front wall 352, a horizontal wall 354, a vertical wall 356, a back wall 358, and an angled wall 360. These walls connect and intersect as shown in FIG. 22 and cooperate with the floor portion 252 to form a drainage path. The catch portion 296 receives the angled wall 360 with the horizontal wall 354 being underneath the lower surface 264. Any gap between the vertical wall 356 and wiper 290 allows water to flow from the trough 316 to the outside of the RV 14. A secondary channel 362 is formed between the wiper 290 and wear bar 254. This secondary channel 362 also drains any water to the corner 350, where it can flow to the outside of the RV 14.

To install the seal 250, the user first aligns the floor portion 252 against the outer edge 23 of the main floor 22 and the lower surface 264 of the mounting portion on the top surface of the main floor 22. Before affixing the wear bar 254 to the mounting portion 260 and main floor 22 with fasteners 298, the ends are mated with corners 350. Ideally, a gap is left between the terminal end of the floor portion 252 and the vertical wall 356. The Mounting portion 260 overlays the horizontal wall 354 and the angled wall 360 is slid inside the catch portion 296. The angled wall 360 is located between catch wall 328 and the hook wall 332. The front wall 352 is overlaid by the exterior leg 270. Sealant may be added where the seal 250 meets the corner 350. The wear bar 254 is then positioned on the upper surface 262 and fasteners 298 are driven through the mounting flange wall 300, the mounting portion 260 and into the main floor 22. The upper surface 262 may include an additional stop wall or other feature that would provide a reference to abut inner lateral edge 301. The stop wall would be short but tall enough to provide a stop for the installer to slide the wear bar 254 to a position before installing fasteners 298. Additional fasteners 299 are driven through the exterior leg 270 and into the outer edge 23 of the main floor 22. The bulb seal 256 is then slid into position using the connector 274 and connector 323 and fastened using screws, nails, or other attaching methods. Attaching the bulb seal 256 to the exterior leg 270 prevents it from sliding off. The arrangement of the surfaces and components is shown in FIG. 23.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A seal for living quarters having main living area walls and a main living area floor defining a main living area, said main living area floor having a lateral edge, an aperture in one of said main living area walls slidably receiving a slide out room having slide out room walls, an end wall, and a second floor defining an auxiliary living space, said slide out room capable of movement between a retracted and an extended position, said second floor adapted for slidably overlaying said main living area floor and separated therefrom, said seal comprising:

a bulb seal having a bulb portion and a connector, said connector formed from L-shaped tabs;

a wear bar formed from a single unitary member having an inner and outer mounting flange with corresponding planar lower surfaces and oppositely located upper surfaces, a base wall extending between said mounting flanges, said wear bar having outer upright members extending from said base wall adjacent said upper surfaces of said mounting flanges, said upright members extending to an arcuate top that is integrally joined thereto, said wear bar having a strut member extending between said upper surface of said mounting flange and said arcuate top, said strut member located at a midpoint between said outer upright members;

a floor portion having a mounting portion including an upper surface and a lower surface, said upper surface of said mounting portion being substantially planar and adapted for receiving said wear bar, said floor portion having an exterior leg affixed thereto at an outer lateral edge of said mounting portion, said exterior leg extending away from and beyond said lower surface of said mounting portion, said exterior leg including a connector formed from L-shaped tabs and adapted for receiving said bulb seal, said mounting portion having a wiper extending from an inner lateral edge opposite of said exterior leg, said wiper extending away from and beyond said upper surface of said mounting portion and in a direction opposite of said exterior leg, a portion of said wiper formed from a material more flexible than said mounting portion; and said inner lateral edge of said mounting portion being connected to a catch wall having an upper end opposite said inner lateral edge, said upper end of said catch wall extending away from and beyond said upper surface of said mounting portion at an oblique angle, said upper end of said catch wall connected to a hook wall, said hook wall substantially parallel to and spaced from a portion of said catch wall, said catch wall and said wiper cooperating to form a valley therebetween.

2. The seal according to claim 1, wherein said catch wall includes a flat portion located between said upper end and said inner lateral edge of said mounting portion, said flat portion is substantially parallel to said mounting portion.

3. The seal according to claim 1, wherein said exterior leg is orthogonally angled with respect to said mounting portion.

4. The seal according to claim 1, wherein said catch wall is wider than said hook wall.

5. The seal according to claim 4, wherein said upper end of said catch wall includes an offsetting wall connected thereto and said end offsetting wall continuing into a retaining wall spaced oppositely to said catch wall creating a pocket.

6. The seal according to claim 1, further comprising a fastener extending through said mounting flange and said mounting portion to affix said wear bar to said floor portion.

7. The seal according to claim 1, wherein said upper surface of said mounting portion having a stop adapted to abut a lateral edge of said mounting flange of said wear bar.

8. The seal according to claim 1, wherein said seal includes a tongue connector carried by one of said corresponding exterior leg and said bulb seal and a groove connector carried by the other of said corresponding exterior leg and said bulb seal for releasably facilitating the connection of said bulb seal to said corresponding exterior leg.

9. A seal for living quarters having main living area walls and a main living area floor defining a main living area, said main living area floor having a lateral edge, an aperture in one of said main living area walls slidably receiving a slide out room having slide out room walls, an end wall, and a second floor defining an auxiliary living space, said slide out room capable of movement between a retracted and an extended position, said second floor adapted for slidably overlaying said main living area floor and separated therefrom, said seal comprising:
  a bulb seal having a bulb portion and a connector, said bulb portion formed from a material having a lower durometer than said connector;
  a wear bar having a mounting flange with a substantially planar lower surface and an oppositely located upper surface, said mounting flange connected to and integrally joined to an arcuate top, said wear bar formed from a material having a higher durometer than said bulb portion;
  a floor portion having a mounting portion including an upper surface and a lower surface, said upper surface of said mounting portion adapted for receiving said wear bar, said floor portion having an exterior leg integrally affixed to an outer lateral edge of said mounting portion, said exterior leg extending away from and beyond said lower surface of said mounting portion, said exterior leg including a connector adapted for receiving said bulb seal, said mounting portion having a wiper extending away from and beyond said upper surface of said mounting portion and in a direction opposite of said exterior leg, said wiper having a portion formed from a material more flexible than said mounting portion; and
  a catch wall extending from said mounting portion in a direction opposite said exterior leg and having an upper end opposite said mounting portion, said upper end of said catch wall extending away from and beyond said upper surface at an oblique angle, said upper end of said catch wall connected to a hook wall, said hook wall substantially parallel to and spaced from a portion of said catch wall, said catch wall and said wiper cooperating to form a valley therebetween.

10. The seal according to claim 9, wherein said catch wall includes a flat portion located between said upper end and said mounting portion, said flat portion is substantially parallel to said mounting portion.

11. The seal according to claim 9, wherein said exterior leg is orthogonally angled with respect to said mounting portion.

12. The seal according to claim 9, wherein said upper end of said catch wall includes an offsetting wall connected thereto and said end offsetting wall continuing into a retaining wall spaced oppositely to said catch wall creating a pocket.

13. The seal according to claim 9, wherein said wear bar having outer upright members extending between said upper surface and said mounting flange.

14. The seal according to claim 9, wherein said wear bar includes a strut wall extending between said upper surface and said mounting flange, said strut wall located at a midpoint between said outer upright members.

15. A seal for living quarters having main living area walls and a main living area floor defining a main living area, said main living area floor having a lateral edge, an aperture in one of said main living area walls slidably receiving a slide out room having slide out room walls, an end wall, and a second floor defining an auxiliary living space, said slide out room capable of movement between a retracted and an extended position, said second floor adapted for slidably overlaying said main living area floor and separated therefrom, said seal comprising:
  a bulb seal having a bulb portion and a connector, said bulb portion formed from a material having a lower durometer than said connector;
  a wear bar having a mounting flange with a lower surface, said mounting flange connected to and integrally joined to a top surface, said top surface spaced from said lower surface, said wear bar formed from a material having a higher durometer than said bulb portion;
  a floor portion having a mounting portion including an upper surface and a lower surface, said upper surface of said mounting portion adapted for receiving said wear bar, said floor portion having an exterior leg integrally affixed to an outer lateral edge of said mounting portion, said exterior leg extending away from and beyond said lower surface of said mounting portion, said exterior leg including a connector adapted for receiving said bulb seal, said mounting portion having a wiper extending away from and beyond said upper surface of said mounting portion and in a direction opposite of said exterior leg, said wiper having a portion formed from a material more flexible than said mounting portion; and
  a catch wall extending from said mounting portion in a direction opposite said exterior leg and having an upper end opposite said mounting portion, said upper end of said catch wall extending away from and beyond said upper surface, said upper end of said catch wall angled with respect to said upper surface of said mounting portion, said catch wall and said wiper cooperating to form a valley therebetween.

16. The seal according to claim 15, wherein said catch wall includes a flat portion located between said upper end and said mounting portion, said flat portion is substantially parallel to said mounting portion.

17. The seal according to claim 15, wherein said exterior leg is orthogonally angled with respect to said mounting portion.

18. The seal according to claim 15, wherein said upper end of said catch wall includes an offsetting wall connected thereto and said end offsetting wall continuing into a retaining wall spaced oppositely to said catch wall creating a pocket.

19. The seal according to claim 15, wherein said wear bar having upright members extending between said top surface and said mounting flange.

20. The seal according to claim 15, wherein said upper end of said catch wall connected to a hook wall, said hook wall substantially parallel to and spaced from a portion of said catch wall.

* * * * *